US012563293B2

(12) United States Patent
Suzuki

(10) Patent No.: US 12,563,293 B2
(45) Date of Patent: Feb. 24, 2026

(54) AUTOMATIC FOCUS CONTROL DEVICE, OPERATION METHOD OF AUTOMATIC FOCUS CONTROL DEVICE, OPERATION PROGRAM OF AUTOMATIC FOCUS CONTROL DEVICE, AND IMAGING APPARATUS

(71) Applicant: FUJIFILM Corporation, Tokyo (JP)

(72) Inventor: Hinako Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 162 days.

(21) Appl. No.: 18/611,750

(22) Filed: Mar. 21, 2024

(65) Prior Publication Data

US 2024/0334053 A1 Oct. 3, 2024

(30) Foreign Application Priority Data

Mar. 29, 2023 (JP) ................................. 2023-053301

(51) Int. Cl.
*H04N 23/67* (2023.01)
*G03B 13/36* (2021.01)
(52) U.S. Cl.
CPC ........... *H04N 23/675* (2023.01); *G03B 13/36* (2013.01)
(58) Field of Classification Search
CPC .. H04N 23/675; H04N 23/611; H04N 23/672; G03B 13/36
See application file for complete search history.

(56) References Cited

U.S. PATENT DOCUMENTS

| | | | |
|---|---|---|---|
| 10,033,921 B2 * | 7/2018 | Song | H04N 23/61 |
| 12,432,442 B2 * | 9/2025 | Hongu | H04N 23/663 |
| 2009/0095880 A1 | 4/2009 | Otsuki | |
| 2012/0242852 A1 * | 9/2012 | Hayward | H04N 23/675 |
| | | | 345/589 |
| 2014/0168479 A1 * | 6/2014 | Ishii | H04N 23/611 |
| | | | 348/241 |
| 2019/0028653 A1 * | 1/2019 | Minami | H04N 23/62 |
| 2021/0409609 A1 * | 12/2021 | Feng | H04N 23/611 |

FOREIGN PATENT DOCUMENTS

| | | |
|---|---|---|
| JP | 2009098317 | 5/2009 |
| JP | 2021105734 | 7/2021 |

* cited by examiner

*Primary Examiner* — Shahbaz Nazrul
(74) *Attorney, Agent, or Firm* — JCIPRNET

(57) ABSTRACT

An imaging apparatus performs focusing calculation for calculating a focusing position of a focus lens based on a signal for calculation read out from an imaging element. A focus adjustment unit includes a setting unit and a focusing calculation unit. A detection unit detects, from a signal for image generation, a rectangular region including a target portion of a target subject of the focusing calculation and a peripheral portion of the target portion. The setting unit is configured to set a high contribution degree region where a degree of contribution to the focusing calculation is higher than other regions in the rectangular region, based on a combination of the target subject and the target portion. The focusing calculation unit performs, in a case where the high contribution degree region is set, the focusing calculation in accordance with the setting.

16 Claims, 37 Drawing Sheets

SIGNAL FOR IMAGE
GENERATION

SIGNAL FOR FIRST
CALCULATION

〈TARGET SUBJECT: PERSON, TARGET PORTION: PUPIL〉

<TARGET SUBJECT: VEHICLE, TARGET PORTION: CAB SEAT>

<TARGET SUBJECT: VEHICLE, TARGET PORTION: HEAD>

〈TARGET SUBJECT: VEHICLE, TARGET PORTION: BODY〉

FIG. 20

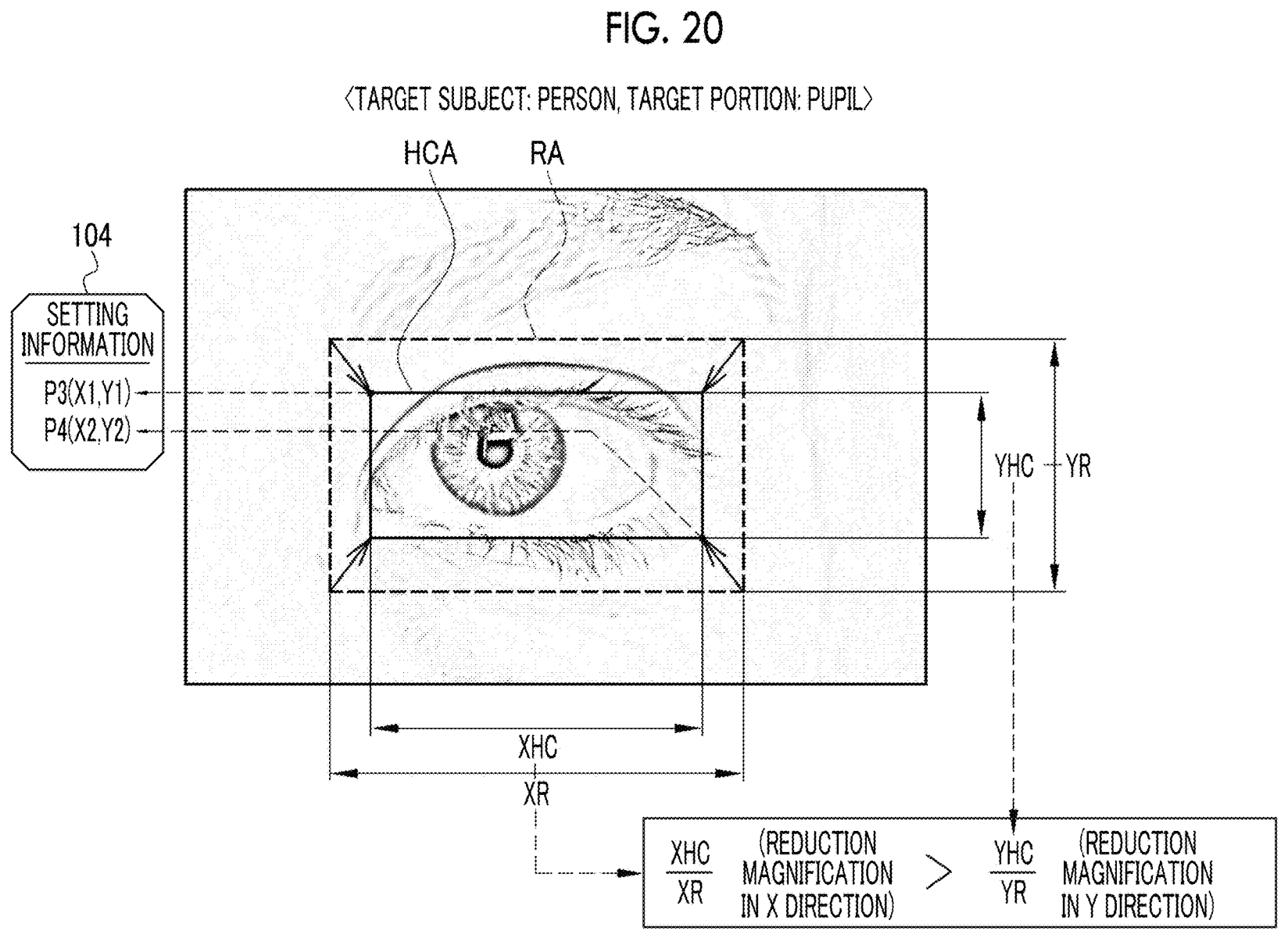

〈TARGET SUBJECT: PERSON, TARGET PORTION: PUPIL〉

$$\frac{XHC}{XR} > \frac{YHC}{YR}$$

(REDUCTION MAGNIFICATION IN X DIRECTION)    (REDUCTION MAGNIFICATION IN Y DIRECTION)

104

SETTING INFORMATION

P3(X1,Y1)
P4(X2,Y2)

RA

HCA

〈TARGET SUBJECT: PERSON, TARGET PORTION: BODY〉

〈TARGET SUBJECT: ANIMAL, TARGET PORTION: PUPIL〉

<TARGET SUBJECT: ANIMAL, TARGET PORTION: BODY>    43N

FIG. 29

\<TARGET SUBJECT: VEHICLE, TARGET PORTION: CAB SEAT\>

FIG. 30

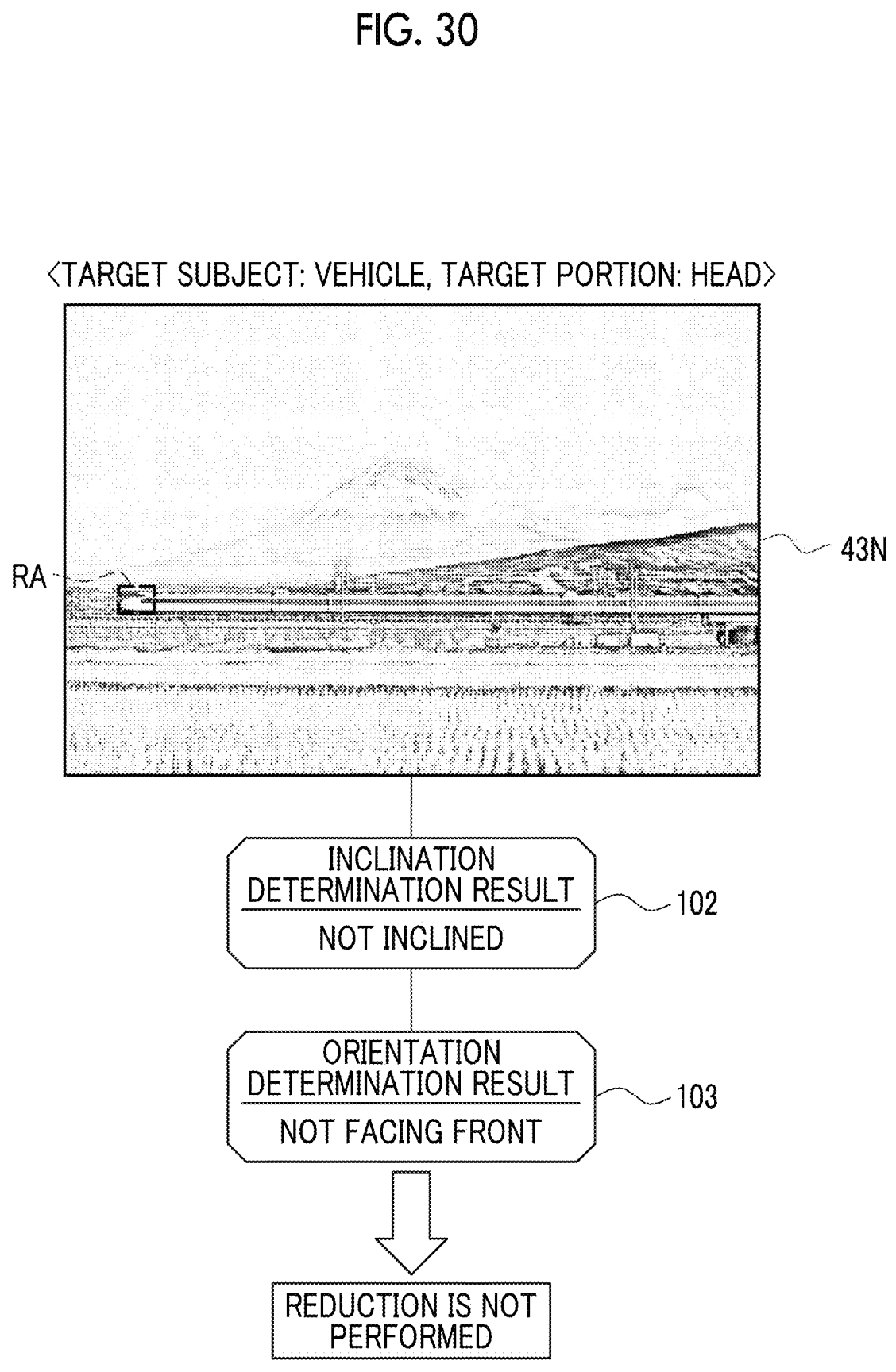

〈TARGET SUBJECT: VEHICLE, TARGET PORTION: HEAD〉

RA

43N

INCLINATION
DETERMINATION RESULT

NOT INCLINED

102

ORIENTATION
DETERMINATION RESULT

NOT FACING FRONT

103

REDUCTION IS NOT
PERFORMED

| TARGET SUBJECT \ TARGET PORTION | PUPIL | FACE, HEAD | BODY | CAB SEAT |
|---|---|---|---|---|
| PERSON | REDUCTION | REDUCTION UNDER CONDITION *1 | REDUCTION | |
| ANIMAL | REDUCTION | REDUCTION UNDER CONDITION *1 | REDUCTION | |
| VEHICLE | | REDUCTION UNDER CONDITION *2 | REDUCTION UNDER CONDITION *2 | REDUCTION UNDER CONDITION *1 |

*1 REDUCTION IN CASE WHERE TARGET PORTION IS INCLINED, AND NO REDUCTION IN CASE WHERE TARGET PORTION IS NOT INCLINED.
*2 REDUCTION IN CASE WHERE TARGET PORTION IS INCLINED, AND IN CASE WHERE TARGET PORTION IS NOT INCLINED AND TARGET SUBJECT FACES FRONT, AND NO REDUCTION IN CASE WHERE TARGET PORTION IS NOT INCLINED AND TARGET SUBJECT DOES NOT FACE FRONT.

1

AUTOMATIC FOCUS CONTROL DEVICE, OPERATION METHOD OF AUTOMATIC FOCUS CONTROL DEVICE, OPERATION PROGRAM OF AUTOMATIC FOCUS CONTROL DEVICE, AND IMAGING APPARATUS

CROSS-REFERENCE TO RELATED APPLICATIONS

The present application claims priority under 35 U.S.C. § 119 to Japanese Patent Application No. 2023-053301 filed on Mar. 29, 2023. The above application is hereby expressly incorporated by reference, in its entirety, into the present application.

BACKGROUND

1. Technical Field

The technique of the present disclosure relates to an automatic focus control device, an operation method of an automatic focus control device, an operation program of an automatic focus control device, and an imaging apparatus.

2. Description of the Related Art

JP2009-098317A discloses an autofocus control circuit comprising a face detection unit, an autofocus target region decision unit, and a focusing state determination unit. The face detection unit specifies a face region in which a face of a subject is included in a subject image, based on captured image data generated by capturing the subject image formed by an imaging optical system. The autofocus target region decision unit decides an autofocus target region from the face region and changes an area ratio of the autofocus target region to the face region. The focusing state determination unit determines an image formation state of the subject image based on a contrast of a region corresponding to the autofocus target region in the captured image data.

JP2021-105734A discloses a control device comprising a focus detection controller in which a focus detection point is disposed such that a density of the focus detection point in a partial region, which is a region designated in an imaging range, is higher than that in an initial state and is further disposed such that the focus detection point in a region excluding the partial region in the imaging range is smaller than that in the initial state or not disposed in the region excluding the partial region in the imaging range to set the density of the focus detection point in the partial region to be higher than the density of the focus detection point in the region excluding the partial region in the imaging range.

SUMMARY

One embodiment according to the technique of the present disclosure provides an automatic focus control device, an operation method of an automatic focus control device, an operation program of an automatic focus control device, and an imaging apparatus capable of performing automatic focus control adapted to a target subject and a target portion of focusing calculation.

An automatic focus control device according to an aspect of the present disclosure is an automatic focus control device that performs focusing calculation for calculating a focusing position of a focus lens based on a signal for calculation read out from an imaging element, the automatic focus control device including a processor. The processor is configured to detect, from an image, a specific region including a target portion of a target subject of the focusing calculation and a peripheral portion of the target portion, set a high contribution degree region where a degree of contribution to the focusing calculation is higher than other regions in the specific region, based on a combination of the target subject and the target portion, and perform, in a case where the high contribution degree region is set, the focusing calculation in accordance with the setting.

It is preferable that the specific region has a rectangular shape.

It is preferable that the processor is configured to reduce a region used for the focusing calculation from the specific region to the high contribution degree region, and perform the focusing calculation using the reduced high contribution degree region. In this case, it is more preferable that the processor is configured to perform the focusing calculation using only the reduced high contribution degree region.

It is preferable that the processor is configured to make a reduction magnification of the high contribution degree region in a first direction different from a reduction magnification of the high contribution degree region in a second direction intersecting the first direction.

It is preferable that the processor is configured to change a reduction magnification of the high contribution degree region according to a size of the specific region.

It is preferable that the processor is configured to control the reduction according to an inclination of the target portion with respect to the specific region.

It is preferable that the processor is configured to control the reduction according to an orientation of the target subject with respect to the imaging element.

It is preferable that the imaging element includes a phase difference detection pixel that outputs the signal for calculation for detecting a phase difference of subject light, and in a case where a direction suitable for detecting the phase difference differs according to an orientation of the imaging element, the processor is configured to change a reduction magnification of the high contribution degree region according to the orientation of the imaging element.

It is preferable that the processor is configured to perform the reduction in a case where the target subject is a person or an animal and the target portion is a pupil of the person, a body of the person, a pupil of the animal, or a body of the animal.

It is preferable that the processor is configured to, in a case where the target subject is a person, an animal, or a vehicle and the target portion is a face of the person, a face of the animal, or a cab seat of the vehicle, not perform the reduction in a case where the target portion is not inclined with respect to the specific region, and perform the reduction in a case where the target portion is inclined with respect to the specific region.

It is preferable that the processor is configured to, in a case where the target subject is a vehicle and the target portion is a head of the vehicle or a body of the vehicle, not perform the reduction in a case where the target portion is not inclined with respect to the specific region and the target subject does not face a front, and perform the reduction in a case where the target portion is not inclined with respect to the specific region and the target subject faces the front, and in a case where the target portion is inclined with respect to the specific region.

It is preferable that the processor is configured to set a degree of contribution of the other regions other than the high contribution degree region to a value larger than zero and lower than a degree of contribution of the high contribution degree region.

An imaging apparatus of the present disclosure comprises the automatic focus control device described above.

An operation method of an automatic focus control device according to an aspect of the present disclosure is an operation method of an automatic focus control device that performs focusing calculation for calculating a focusing position of a focus lens based on a signal for calculation read out from an imaging element, the operation method including detecting, from an image, a specific region including a target portion of a target subject of the focusing calculation and a peripheral portion of the target portion, setting a high contribution degree region where a degree of contribution to the focusing calculation is higher than other regions in the specific region, based on a combination of the target subject and the target portion, and performing, in a case where the high contribution degree region is set, the focusing calculation in accordance with the setting.

An operation program of an imaging apparatus according to an aspect of the present disclosure is an operation program of an automatic focus control device that performs focusing calculation for calculating a focusing position of a focus lens based on a signal for calculation read out from an imaging element, the operation program causing a computer to execute a process including detecting, from an image, a specific region including a target portion of a target subject of the focusing calculation and a peripheral portion of the target portion, setting a high contribution degree region where a degree of contribution to the focusing calculation is higher than other regions in the specific region, based on a combination of the target subject and the target portion, and performing, in a case where the high contribution degree region is set, the focusing calculation in accordance with the setting.

BRIEF DESCRIPTION OF THE DRAWINGS

Exemplary embodiments according to the technique of the present disclosure will be described in detail based on the following figures, wherein:

FIG. 1 is a diagram showing a configuration of an imaging apparatus;

FIG. 3 is a diagram showing a configuration of a normal pixel;

FIG. 4 is a diagram showing a configuration of a first phase difference detection pixel;

FIG. 20 is a diagram showing the high contribution degree region set by the setting unit and setting information on the high contribution degree region;

FIG. 29 is a diagram showing processing of the setting unit in a case where the target subject is a vehicle, the target portion is a cab seat, and the inclination determination unit determines that the target portion is inclined with respect to the rectangular region;

FIG. 30 is a diagram showing processing of the setting unit in a case where the target subject is a vehicle, the target portion is a head, the inclination determination unit determines that the target portion is not inclined with respect to the rectangular region, and further, the orientation determination unit determines that the target subject does not face the front;

FIG. 36 is a table summarizing the processing of the setting unit according to a combination of the target subject and the target portion;

DETAILED DESCRIPTION

First Embodiment

Figure 1:
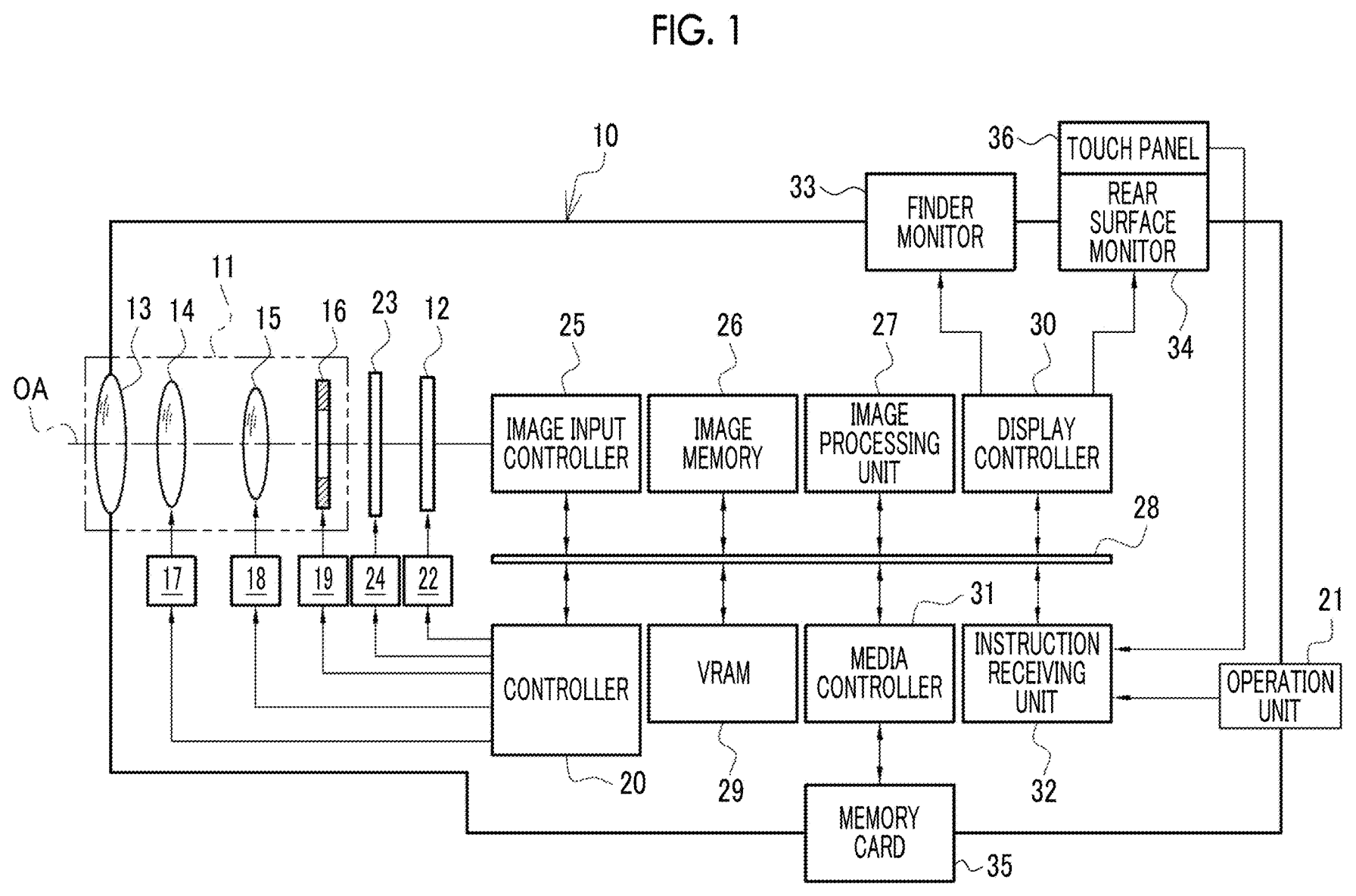
Figure 2:
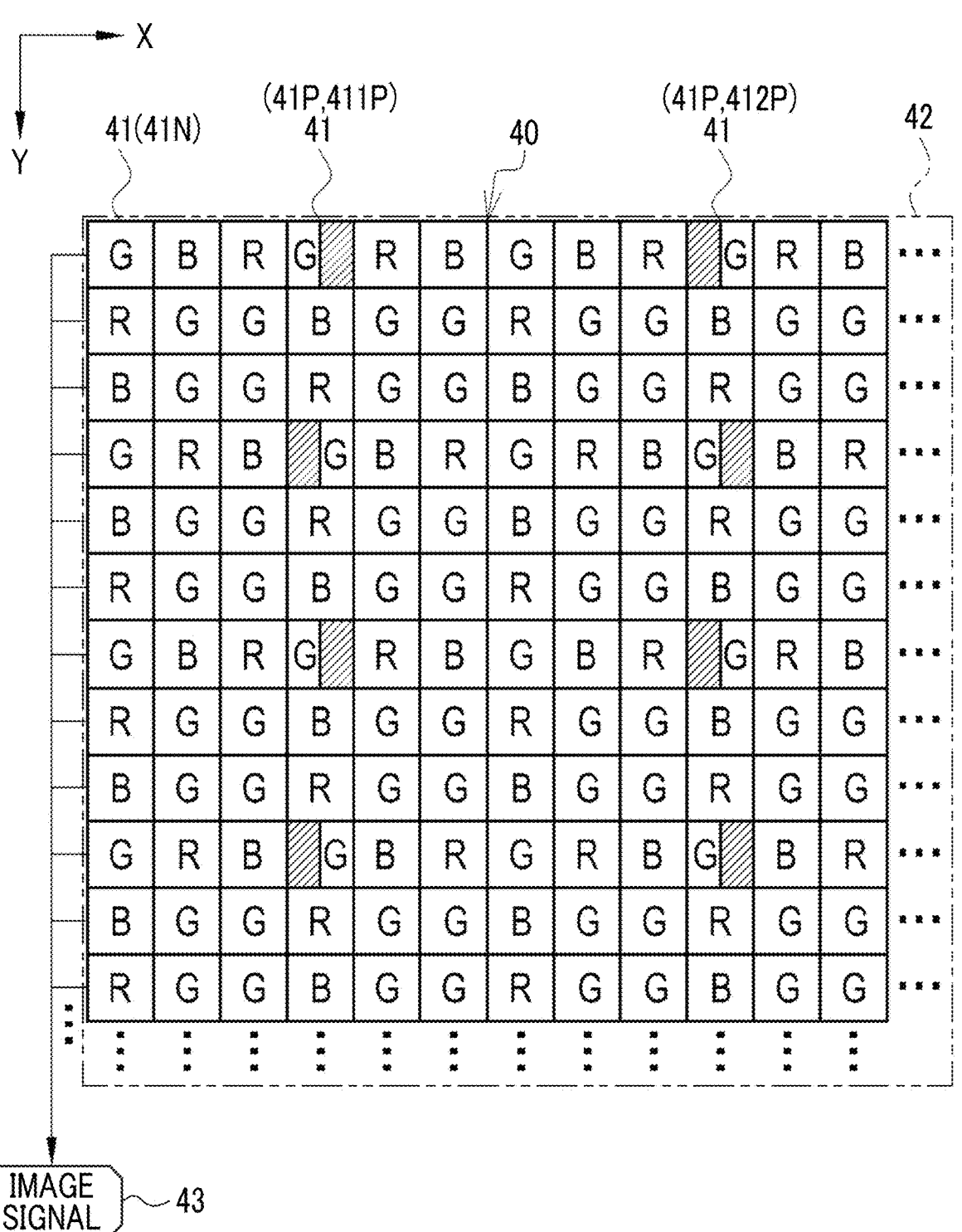
FIG. 2 is a diagram showing an arrangement of pixels of an imaging element.

As shown in FIG. 1 as an example, an imaging apparatus 10 is, for example, a mirrorless single-lens digital camera, and comprises an imaging optical system 11 and an imaging element 12. The imaging optical system 11 has a plurality of types of lenses for forming an image of subject light on the imaging element 12. Specifically, the imaging optical system 11 has an objective lens 13, a focus lens 14, and a zoom lens 15. Each of these lenses 13 to 15 is disposed in this order from an object side (subject side) toward an image formation side (imaging element 12 side). Although simplified in FIG. 1, each of the lenses 13 to 15 is actually a lens group in which a plurality of lenses are combined. The imaging optical system 11 also has a stop 16. The stop 16 is disposed closest to the image formation side in the imaging optical system 11. The imaging apparatus 10 may be a type in which a lens barrel with built-in the imaging optical system 11 and the like is integrated with a main body with built-in the imaging element 12 and the like, or may be a so-called lens interchangeable type in which the lens barrel and the main body are separate bodies.

The focus lens 14 is provided with a focus lens driving mechanism 17, the zoom lens 15 is provided with a zoom lens driving mechanism 18, and the stop 16 is provided with a stop driving mechanism 19. The focus lens driving mechanism 17 holds the focus lens 14, and includes a cam ring for focusing in which a cam groove is formed on the outer periphery of the focus lens 14, a motor for focusing that rotates the cam ring for focusing around an optical axis OA to move the cam ring for focusing along the optical axis OA, a driver of the motor for focusing, and the like. Similarly, the zoom lens driving mechanism 18 holds the zoom lens 15, and includes a cam ring for zoom in which a cam groove is formed on the outer periphery of the zoom lens 15, a motor for zoom that rotates the cam ring for zoom around the optical axis OA to move the cam ring for zoom along the optical axis OA, a driver of the motor for zoom, and the like. The stop driving mechanism 19 includes a motor for stop that opens and closes a plurality of stop leaf blades of the stop 16, a driver of the motor for stop, and the like.

The motor for focusing, the motor for zoom, and the motor for stop are, for example, stepping motors. In this case, positions of the focus lens 14 and the zoom lens 15 on the optical axis OA and an opening degree of the stop 16 can be derived from drive amounts of the motor for focusing, the motor for zoom, and the motor for stop. A position sensor may be provided to detect the positions of the focus lens 14 and the zoom lens 15, instead of the drive amounts of the motor for focusing and the motor for zoom.

An electric component, such as the motor or the driver, of each of the driving mechanisms 17 to 19 is connected to a controller 20. The electric component of each of the driving mechanisms 17 to 19 is driven under the control of the controller 20. More specifically, the controller 20 issues a drive signal in response to an instruction from a user, which is input via an operation unit 21, to drive the electric component of each of the driving mechanisms 17 to 19. For example, in a case where an instruction to change an angle of view to a telephoto side is input via an angle-of-view change switch of the operation unit 21, the controller 20 issues, to the driver of the motor for zoom of the zoom lens driving mechanism 18, the drive signal to move the zoom lens 15 to the telephoto side.

The motor for focusing, the motor for zoom, and the motor for stop output the drive amounts to the controller 20. The controller 20 derives, from the drive amounts, the positions of the focus lens 14 and the zoom lens 15 on the optical axis OA and the opening degree of the stop 16.

The imaging element 12 is, for example, a complementary metal-oxide-semiconductor (CMOS) image sensor, and has an imaging surface 42 (refer to FIG. 2) that images the subject light. The imaging element 12 is disposed such that a center of the imaging surface 42 matches the optical axis OA and the imaging surface 42 is orthogonal to the optical axis OA. The terms "match" and "orthogonal" as used herein mean not only perfect match and orthogonality but also match and orthogonality in a sense including an error generally allowed in the technical field to which the technique of the present disclosure belongs.

An imaging element driver 22 is connected to the imaging element 12. The imaging element driver 22 is connected to the controller 20. The imaging element driver 22 performs, under the control of the controller 20, supplying of a vertical scanning signal and a horizontal scanning signal to the imaging element 12, or the like to control an imaging timing of the subject light by the imaging element 12.

A shutter 23 is provided between the imaging optical system 11 and the imaging element 12. The shutter 23 is, for example, a focal-plane shutter having a front curtain and a rear curtain. A shutter driving mechanism 24 is connected to the shutter 23. The shutter driving mechanism 24 includes an electromagnet that holds the front curtain and the rear curtain and releases the holding thereof to cause the front curtain and the rear curtain to travel, a driver of the electromagnet, and the like. The shutter driving mechanism 24 is driven to open and close the shutter 23 under the control of the controller 20.

The controller 20 is connected to each unit such as an image input controller 25, an image memory 26, and an image processing unit 27, through a busline 28. In addition, the busline 28 is connected to a video random access memory (VRAM) 29, a display controller 30, a media controller 31, an instruction receiving unit 32, and the like. Although not shown, the busline 28 is also connected to a strobe driving controller that controls the drive of a strobe device, an external communication interface (I/F) for communicating with an external device via a connection terminal such as a universal serial bus (USB) terminal or a wireless communication I/F, and the like.

Image data obtained by imaging the subject light is input to the image input controller 25 from the imaging element 12. The image input controller 25 outputs the image data to the image memory 26. The image memory 26 is, for example, a synchronous dynamic random access memory (SDRAM), and temporarily stores the image data.

The image processing unit 27 reads out unprocessed image data from the image memory 26. The image processing unit 27 performs various types of image processing on the image data. The various types of image processing are, for example, offset correction processing, sensitivity correction processing, pixel interpolation processing, white balance correction processing, gamma correction processing, demosaicing, brightness signal and color difference signal generation processing, contour enhancement processing, and color correction processing. The image processing unit 27 writes the image data subjected to the various types of image processing back to the image memory 26.

The image data that is subjected to the various types of image processing and is displayed as a live view image (also referred to as through-image) is input into the VRAM 29 from the image memory 26. The VRAM 29 has a region in which the image data for two consecutive frames is stored. The image data stored in the VRAM 29 is sequentially rewritten to new image data. The VRAM 29 sequentially outputs, to the display controller 30, newer image data of the image data for two consecutive frames.

The display controller 30 has a so-called video encoder function of converting the image data from the VRAM 29 into video data and outputting the video data to any one of a finder monitor 33 or a rear surface monitor 34. Accordingly, the user can visually recognize the live view image through any one of the finder monitor 33 or the rear surface monitor 34. A display frame rate of the live view image is, for example, 60 frames per second (fps).

Which one of the finder monitor 33 and the rear surface monitor 34 the video data is output to is decided as follows, for example. That is, a pupil detection sensor is provided in a finder. In a case where the pupil detection sensor detects that the user looks into the finder, the video data is output to the finder monitor 33. On the contrary, in a case where the pupil detection sensor detects that the user does not look into the finder, the video data is output to the rear surface monitor 34.

In a case where an instruction to start capturing a static image or a video is issued via a fully push-operated release button of the operation unit 21, the image processing unit 27 performs compression processing on the image data of the image memory 26. In a case of the static image, the image processing unit 27 performs, for example, the compression processing of a joint photographic experts group (JPEG) format on the image data. In a case of the video, the image processing unit 27 performs, for example, the compression processing of a moving picture experts group (MPEG) format on the image data. The image processing unit 27 outputs, to the media controller 31, the image data subjected to the compression processing.

The media controller 31 records, in a memory card 35, the image data subjected to the compression processing from the image processing unit 27. The memory card 35 is attachably and detachably mounted in a memory card slot (not illustrated).

In a case where an image playback mode is selected via a mode selector switch of the operation unit 21, the media controller 31 reads out the image data from the memory card 35 to output the image data to the image processing unit 27. The image processing unit 27 performs expansion processing on image data from the memory card 35. The image data subjected to the expansion processing is output to the display controller 30. The display controller 30 converts the image data into the video data and outputs the video data to the rear surface monitor 34. Accordingly, the user can visually recognize a reproduction image through the rear surface monitor 34.

The instruction receiving unit 32 receives various operation instructions input from the user via a touch panel 36 that is integrally provided with the operation unit 21 and the rear surface monitor 34. The instruction receiving unit 32 outputs the received various operation instructions to the controller 20 through the busline 28.

As described above, the operation unit 21 includes the angle-of-view change switch, the release button, and the mode selector switch. The release button is a two-stage push button capable of performing a half push operation and a full push operation. An instruction to prepare capturing of a static image or a video is issued by a half push operation of the release button, and the instruction to start capturing a static image or a video is issued by the full push operation of the release button. In addition to these switches, the operation unit 21 further includes a menu button for displaying various setting menus on the rear surface monitor 34, a cross key used for numerical value setting, switching of options, and the like, and a confirmation button that is operated in a case of setting confirmation and the like. The touch panel 36 is superimposed on a display surface of the rear surface monitor 34. The touch panel 36 detects contact with a finger of the user or a dedicated indicator such as a stylus pen to recognize the various operation instructions from the user.

The modes that can be switched by the mode selector switch include a static-image capturing mode, a video imaging mode, an image playback mode, a setting mode, and the like. The static-image capturing mode includes not only a normal capturing mode in which one static image is captured but also a continuous capturing mode in which static images are continuously captured at a predetermined capturing interval (for example, frame rate of 5 fps to 10 fps). The continuous capturing mode is activated, for example, in a case where a full push state of the release button continues for a predetermined time or longer (for example, one second or longer). The continuous capturing mode ends in a case where the full push state of the release button is released.

As shown in FIG. 2 as an example, the imaging element 12 is provided with a photoelectric conversion unit 40. The photoelectric conversion unit 40 is configured of a plurality of pixels 41 two-dimensionally arranged along an X direction and a Y direction. The plurality of pixels 41 form the imaging surface 42. As is well known, the pixel 41 is configured of a micro lens 45, a color filter 46, and a photoelectric conversion element 47 such as a photodiode (refer to FIGS. 3 to 5 for all). The X direction and the Y direction are a horizontal direction and a vertical direction in a state where a bottom surface of the imaging apparatus 10 is placed on a horizontal plane. Therefore, the X direction and the Y direction are perpendicular to each other. The X direction is an example of "first direction" according to the technique of the present disclosure. The Y direction is an example of "second direction" according to the technique of the present disclosure.

Scanning lines parallel to the X direction are wired between rows of the pixels 41. Further, signal lines parallel to the Y direction are wired between columns of the pixels 41. (The photoelectric conversion element 47 of) the pixel 41 is connected to the signal line via an amplifier and a switch. The scanning line is also connected to the switch. In a case of the accumulation operation that accumulates a signal charge corresponding to the subject light in (the photoelectric conversion element 47 of) the pixel 41, an off signal is supplied as the vertical scanning signal through the scanning line to turn off the switch. In a case of the readout operation that reads out an image signal (voltage signal) 43 corresponding to the signal charge from (the photoelectric conversion element 47 of) the pixel 41, an on signal is supplied as the vertical scanning signal through the scanning line to turn on the switch. An end of the signal line is connected to a correlated double sampling (CDS) circuit and an analog to digital converter (ADC) circuit. The CDS circuit performs sampling two correlation pile on the image signal 43 input through the signal line. The ADC circuit converts the image signal 43 subjected to the sampling two correlation pile into a digital image signal 43.

The pixels 41 are divided, depending on types of the color filter 46, into three types of a green pixel (denoted as "G" in FIG. 2) having sensitivity to light in a green wavelength range, a red pixel (denoted as "R" in FIG. 2) having sensitivity to light in a red wavelength range, and a blue pixel (denoted as "B" in FIG. 2) having sensitivity to light in a blue wavelength range. The three types of the pixels 41 are regularly arranged in a predetermined array. As the predetermined array, a so-called Bayer array is exemplified in which two green pixels, one blue pixel, and one red pixel are arranged in vertical and horizontal 2×2 pixels.

The pixel 41 includes a normal pixel 41N and a phase difference detection pixel 41P. The phase difference detection pixel 41P further includes a first phase difference detection pixel 411P and a second phase difference detection pixel 412P. The normal pixel 41N has three types of pixels of the green pixel, the blue pixel, and the red pixel, but the phase difference detection pixel 41P has only the green pixel.

The phase difference detection pixels 41P are arranged at predetermined spacings in the X direction and the Y direction. In FIG. 2, the phase difference detection pixels 41P are arranged at a spacing of five pixels in the X direction and at a spacing of two pixels in the Y direction. Further, the phase difference detection pixels 41P are arranged such that the first phase difference detection pixels 411P and the second phase difference detection pixels 412P alternately appear in the X direction and the Y direction. For example, in a case where a fourth row is viewed, the phase difference detection pixels 41P are arranged in an order, from left to right, of the second phase difference detection pixel 412P, the first phase difference detection pixel 411P, and the like. Further, for example, in a case where a tenth column is viewed, the phase difference detection pixels 41P are arranged in an order, from top to bottom, of the second phase difference detection pixel 412P, the first phase difference detection pixel 411P, the second phase difference detection pixel 412P, the first phase difference detection pixel 411P, and the like. The first phase difference detection pixel 411P and the second phase difference detection pixel 412P adjacent to each other in the X direction and the Y direction configure one set for detecting a phase difference α (refer to FIG. 6).

Figures 3, 4:
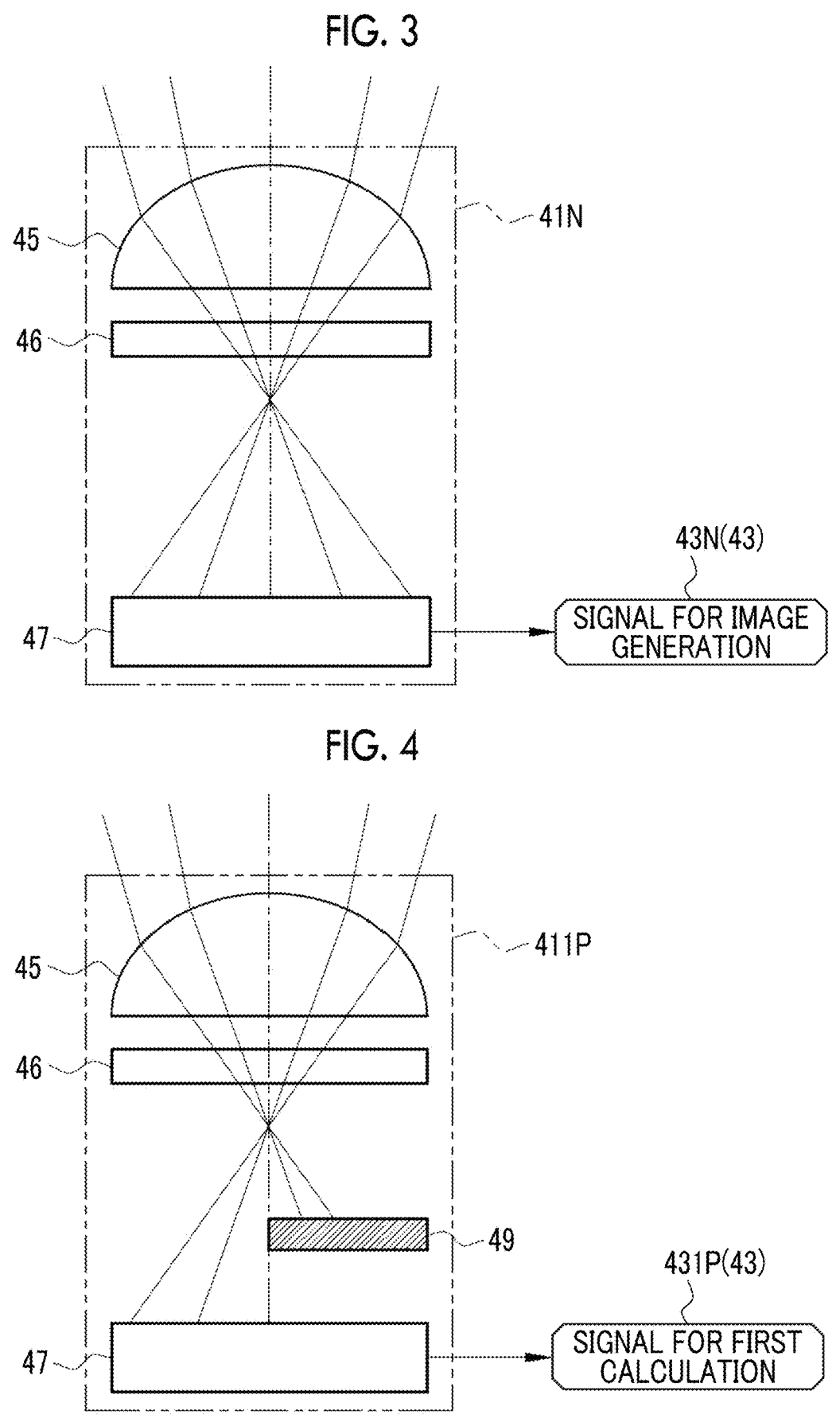
Figure 5:
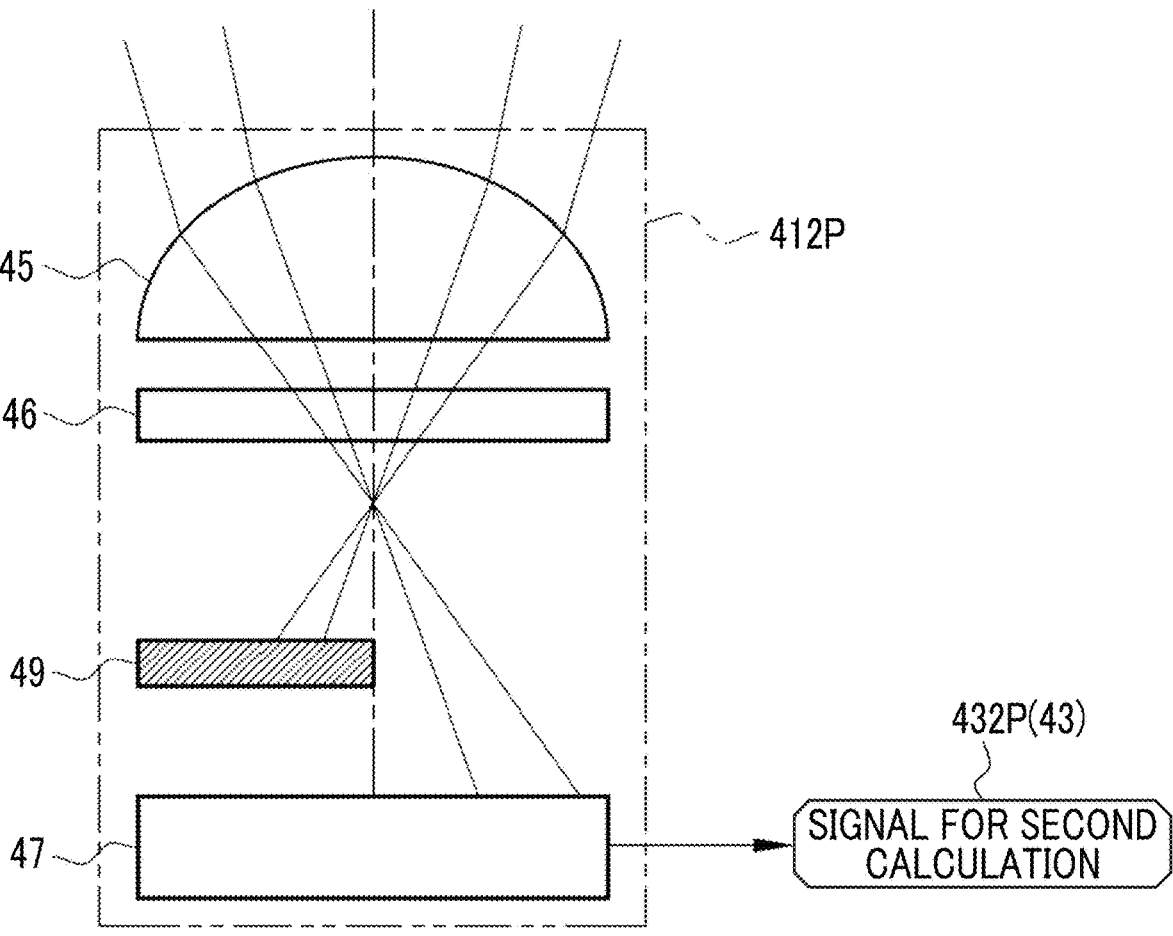
FIG. 5 is a diagram showing a configuration of a second phase difference detection pixel.

As shown in FIGS. 3 to 5 as an example, the normal pixel 41N, the first phase difference detection pixel 411P, and the second phase difference detection pixel 412P have the same basic configuration and are configured of the micro lens 45, the color filter 46, and the photoelectric conversion element 47, which are disposed in the order from the object side.

As shown in FIG. 3, the photoelectric conversion element 47 of the normal pixel 41N outputs, as the image signal 43, a signal for image generation 43N corresponding to the subject light that is condensed by the micro lens 45 and transmitted through the color filter 46. The signal for image generation 43N is stored in the image memory 26 as a part of the image data.

As shown in FIGS. 4 and 5, a light shielding member 49 is disposed between the color filter 46 and the photoelectric conversion element 47 for the first phase difference detection pixel 411P and the second phase difference detection pixel 412P. The light shielding member 49 is not disposed in the normal pixel 41N. The light shielding member 49 of the first phase difference detection pixel 411P shields a right half of the photoelectric conversion element 47 as viewed from the object side. On the contrary, the light shielding member 49 of the second phase difference detection pixel 412P shields a left half of the photoelectric conversion element 47 as viewed from the object side.

The photoelectric conversion element 47 of the first phase difference detection pixel 411P outputs, as the image signal 43, a signal for first calculation 431P corresponding to the subject light that is condensed by the micro lens 45 and transmitted through the color filter 46, and whose right half is shielded by the light shielding member 49. On the contrary, the photoelectric conversion element 47 of the second phase difference detection pixel 412P outputs, as the image signal 43, a signal for second calculation 432P corresponding to the subject light that is condensed by the micro lens 45 and transmitted through the color filter 46, and whose left half is shielded by the light shielding member 49. The signal for first calculation 431P and the signal for second calculation 432P are stored in the image memory 26 as a part of the image data, similarly to the signal for image generation 43N. The signal for first calculation 431P and the signal for second calculation 432P are examples of "signal for calculation" according to the technique of the present disclosure. Hereinafter, in a case where the signals do not need to be particularly distinguished from each other, the signal for first calculation 431P and the signal for second calculation 432P are collectively denoted as a signal for calculation 43P.

Figure 6:
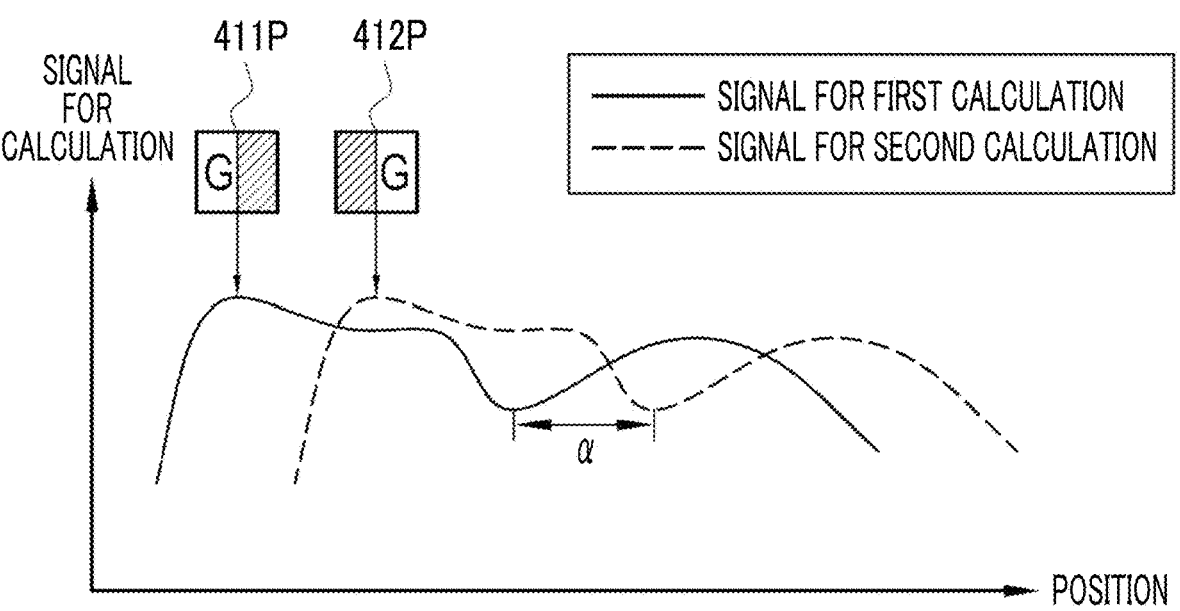
FIG. 6 is a graph showing a phase difference between a signal for first calculation and a signal for second calculation.

As shown in FIG. 6 as an example, the phase difference α appears between the signal for first calculation 431P and the signal for second calculation 432P, which are output from the first phase difference detection pixel 411P and the second phase difference detection pixel 412P adjacent to each other in the X direction and the Y direction. With the phase difference α, it is possible to know a movement direction and amount of the focus lens 14 to obtain a focusing position. The imaging apparatus 10 performs automatic focus control of calculating the focusing position of the focus lens 14 (hereinafter denoted as focusing calculation) based on the phase difference α and of automatically moving the focus lens 14 to the calculated focusing position.

As the name indicates, the signal for image generation 43N is used to generate an image such as the live view image. On the contrary, the signal for calculation 43P is used only to calculate the phase difference α and is not used to generate the image. For this reason, in the pixel interpolation processing, the image processing unit 27 interpolates a pixel value of the phase difference detection pixel 41P by using the signal for image generation 43N of the normal pixel 41N around the phase difference detection pixel 41P.

Figure 7:
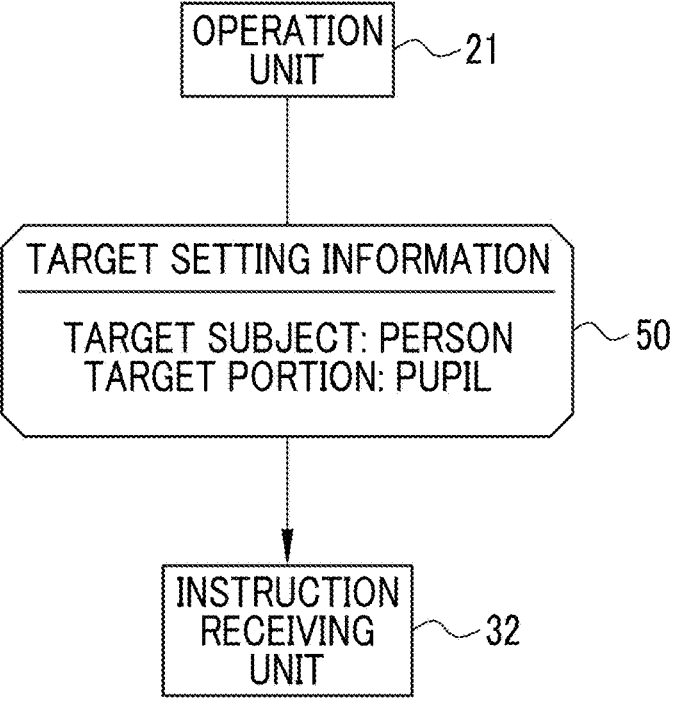
FIG. 7 is a diagram showing target setting information.

As shown in FIG. 7 as an example, the user inputs target setting information 50 of the automatic focus control via the operation unit 21. The target setting information 50 includes a target subject that is a target of the focusing calculation in the automatic focus control, and a target portion that is included in the target subject and is a target of the focusing calculation in the automatic focus control. The target subject is a subject that the user wants to focus on, and the target portion is a portion of the subject that the user wants to focus on. The target subject includes an animal, a vehicle, a flower, a mountain, a building, or the like, in addition to the person shown in the drawing. The animal is, for example, a dog, a cat, and a bird. The vehicle is, for example, an automobile, a railway car, and an airplane. The target portion is a face of a person, a body of a person, a pupil of an animal, a face of an animal, a body of an animal, a cab seat of a vehicle, a head of a vehicle, a body of a vehicle, and the like, in addition to the pupil of the person shown in the drawing.

Here, the pupil of the person or the animal is a pupil, that is, a so-called iris. The face of the person or the animal is a portion having, for example, a forehead, chews, a chin, eyes, a nose, a mouth, ears, and the like. The body of the person or the animal is a portion excluding the head, neck, limbs, and tail. The cab seat of the vehicle is a front window that covers a front panel, a cab seat, a passenger seat, and the like in a case of an automobile, a front window that covers a control platform and a cab seat of a head car in a case of a railway car, and a front window that covers a cockpit in a case of an airplane. The head of the vehicle is a front body in a case of an automobile, a portion of a head car having a destination display, a front window, a headlight, or the like in a case of a railway car, and a nose portion having a radome, front window, or the like in a case of an airplane. The body of the vehicle is the entire body excluding wheels in a case of an automobile, the entire body excluding wheels in a case of a railway car regardless of whether the car is a head car, an intermediate car, or a last car, and the entire body excluding a head, main wings, a caudal wing, and the like in a case of an airplane.

The instruction receiving unit 32 receives the target setting information 50. The instruction receiving unit 32 outputs the target setting information 50 to the controller 20. The controller 20 detects a rectangular region RA (refer to FIG. 11 and the like) including the target portion of the target setting information 50, and performs the automatic focus control to focus on the detected rectangular region RA. The rectangular region RA is an example of "specific region" according to the technique of the present disclosure.

Figure 8:
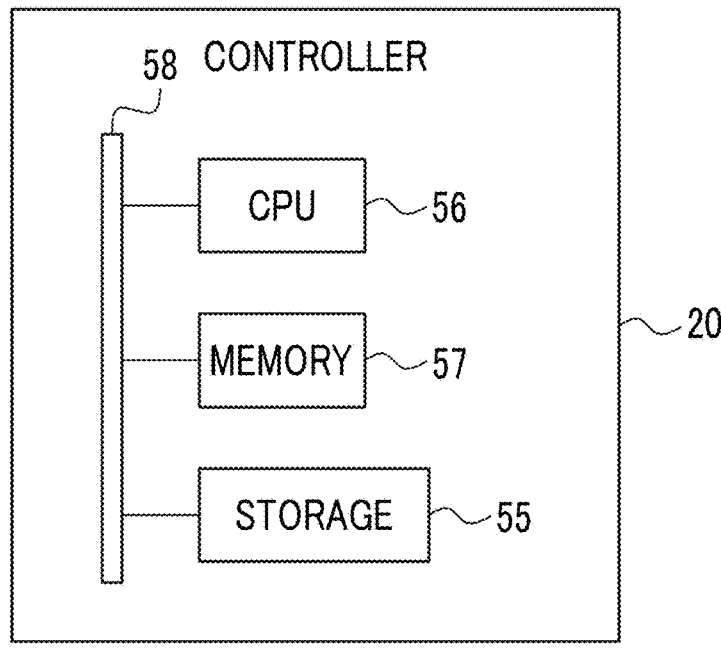
FIG. 8 is a diagram showing a detailed configuration of a controller.

As shown in FIG. 8 as an example, the controller 20 comprises a storage 55, a central processing unit (CPU) 56, and a memory 57. The storage 55, the CPU 56, and the memory 57 are connected to each other via a busline 58. The controller 20 is an example of "automatic focus control device" and "computer" according to the technique of the present disclosure.

The storage 55 is a non-volatile storage device such as an electrically erasable programmable read-only memory (EEPROM). The storage 55 stores various programs, various types of data associated with the various programs, and the like. Instead of the EEPROM, a ferroelectric random access memory (FeRAM) or a magnetoresistive random access memory (MRAM) may be used as the storage 55.

The memory 57 is a work memory for the CPU 56 to execute the processing. The CPU 56 loads the program stored in the storage 55 into the memory 57 to execute the processing according to the program. With the above, the CPU 56 controls each unit of the imaging apparatus 10 in an integrated manner. The CPU 56 is an example of "processor" according to the technique of the present disclosure. The memory 57 may be built into the CPU 56.

Figure 9:
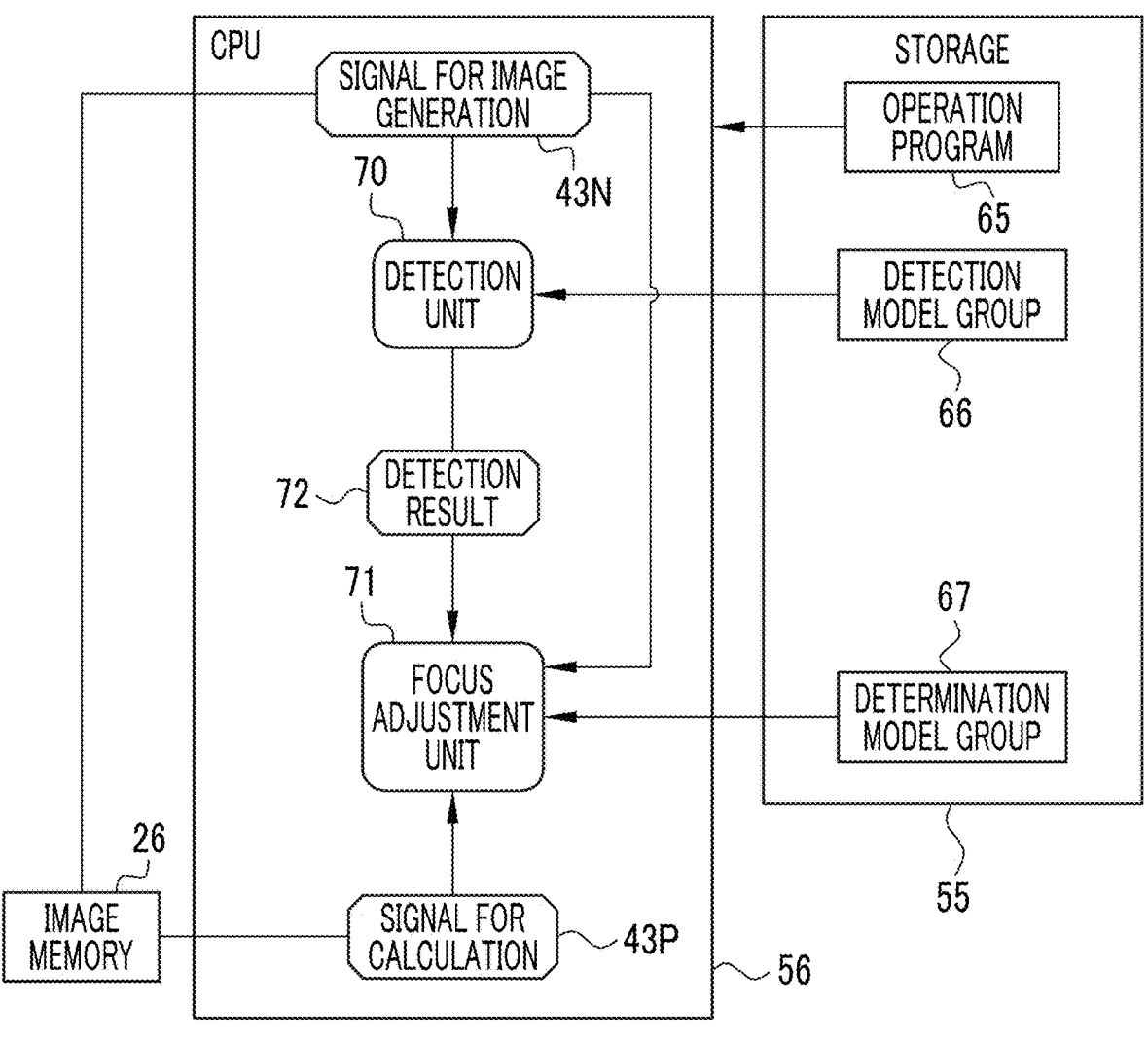
FIG. 9 is a block diagram showing a processing unit of a CPU.

As shown in FIG. 9 as an example, an operation program 65 is stored in the storage 55. The operation program 65 is a program that causes the CPU 56 to perform the automatic focus control and the like. That is, the operation program 65 is an example of "operation program of automatic focus control device" according to the technique of the present disclosure. A detection model group 66 and a determination model group 67 are also stored in the storage 55, in addition to the operation program 65. The detection model group 66 is a set of machine learning models that are prepared for each target portion and are used to detect the rectangular region RA including the target portion (refer to FIG. 10). The determination model group 67 is a set of machine learning models for various types of determination (refer to FIG. 14).

In a case where the operation program 65 is started, the CPU 56 functions as a detection unit 70 and a focus adjustment unit 71, in cooperation with the memory 57 and the like. The detection unit 70 reads out the signal for image generation 43N from the image memory 26. The signal for image generation 43N can be handled as two-dimensional image data. The detection unit 70 detects the rectangular region RA including the target portion from the signal for image generation 43N by using the machine learning model corresponding to the target portion of the target setting information 50 among the plurality of machine learning models of the detection model group 66. The detection unit 70 outputs a detection result 72 of the rectangular region RA to the focus adjustment unit 71.

The focus adjustment unit 71 reads out the signal for calculation 43P from the image memory 26. Specifically, the signal for calculation 43P is data in which a plurality of signals for first calculation 431P output from the first phase difference detection pixel 411P are two-dimensionally arranged in the X direction and the Y direction following the arrangement of the first phase difference detection pixels 411P, and data in which a plurality of signals for second calculation 432P output from the second phase difference detection pixel 412P are two-dimensionally arranged in the X direction and the Y direction following the arrangement of the second phase difference detection pixels 412P. Therefore, the signal for calculation 43P can be handled as the two-dimensional image data like the signal for image generation 43N. For example, in a case where the instruction to prepare capturing of a static image or a video is issued by the half push operation of the release button, the focus adjustment unit 71 performs the automatic focus control based on the signal for calculation 43P. Details of the automatic focus control will be described below.

Figure 10:
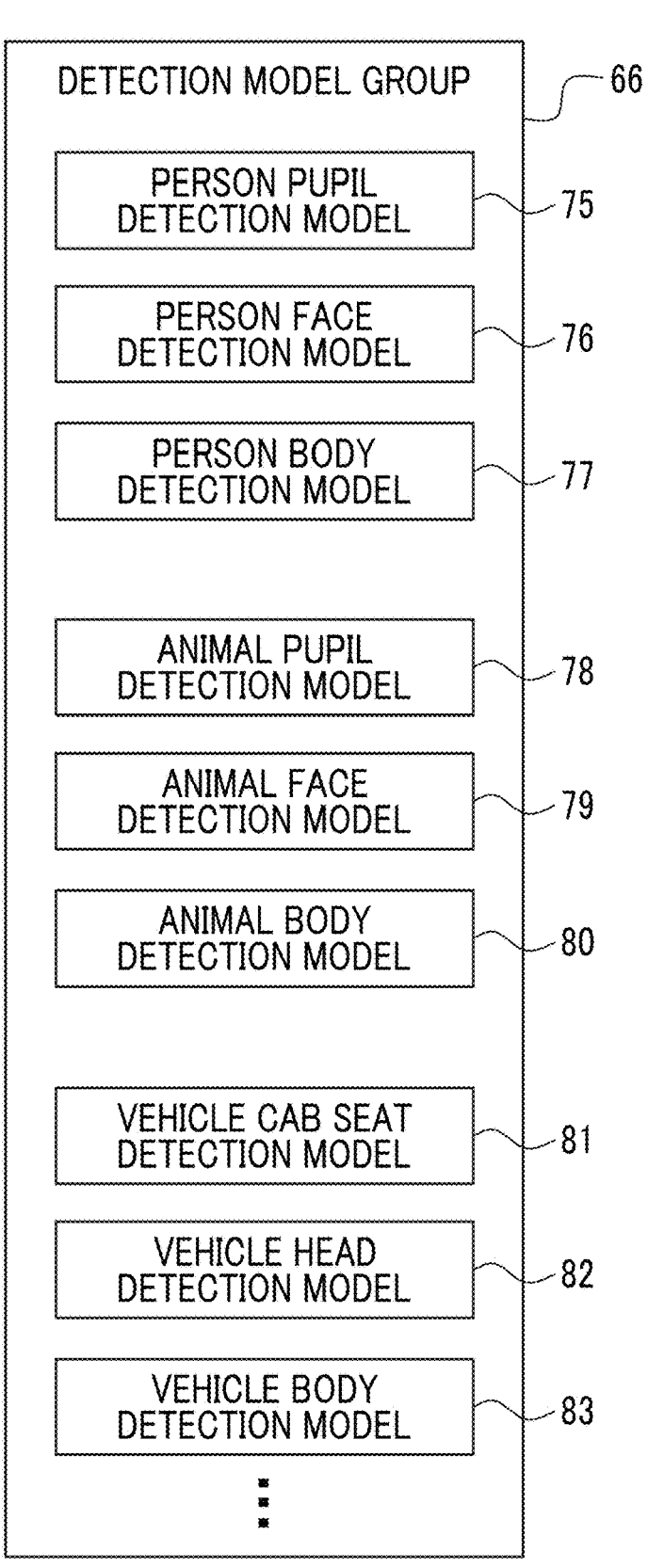
FIG. 10 is a diagram showing a detection model group.

As shown in FIG. 10 as an example, the detection model group 66 has a person pupil detection model 75 that detects the rectangular region RA including the pupil of the person, a person face detection model 76 that detects the rectangular region RA including the face of the person, and a person body detection model 77 that detects the rectangular region RA including the body of the person. Further, the detection model group 66 has an animal pupil detection model 78 that detects the rectangular region RA including the pupil of the animal, an animal face detection model 79 that detects the rectangular region RA including the face of the animal, and an animal body detection model 80 that detects the rectangular region RA including the body of the animal. Furthermore, the detection model group 66 has a vehicle cab seat detection model 81 that detects the rectangular region RA including the cab seat of the vehicle, a vehicle head detection model 82 that detects the rectangular region RA including the head of the vehicle, and a vehicle body detection model 83 that detects the rectangular region RA including the body of the vehicle. These detection models 75 to 83 are machine learning models subjected to learning to output the detection result 72 of the rectangular region RA in a case where (the two-dimensional image data represented by) the signal for image generation 43N is input, and are constructed by, for example, a convolutional neural network. The detection model group 66 includes a large number of detection models in addition to these detection models 75 to 83.

Figure 11:
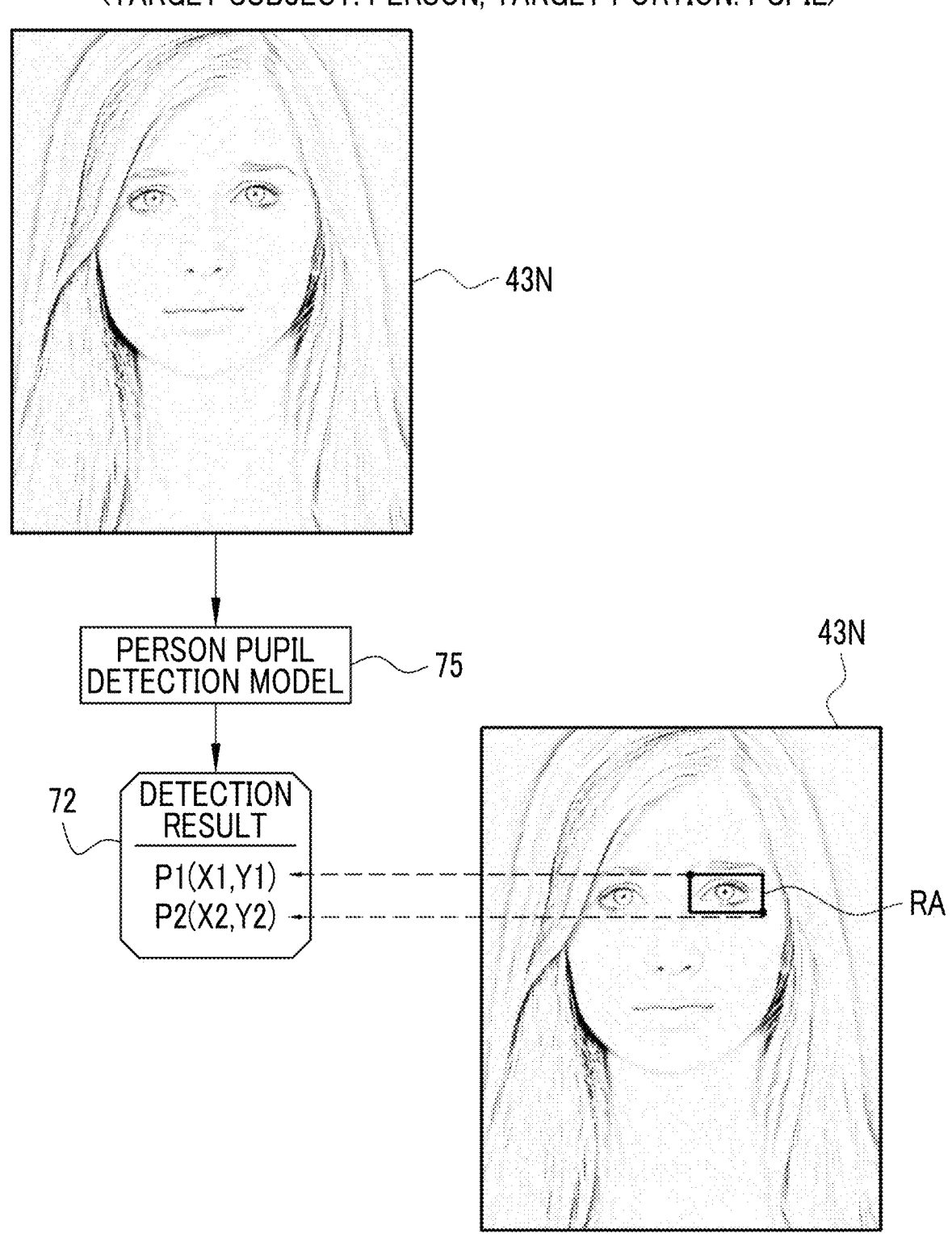
FIG. 11 is a diagram showing, in a case where a target subject is a person and a target portion is a pupil, a state in which the pupil of the person is detected by using a person pupil detection model.

As shown in FIG. 11 as an example, in a case where the target subject of the target setting information 50 is a person and the target portion is a pupil, the detection unit 70 inputs the signal for image generation 43N to the person pupil detection model 75. In response to the input of the signal for image generation 43N, the person pupil detection model 75 outputs the detection result 72 of the rectangular region RA including the pupil of the person. The detection result 72 is, for example, XY coordinates of two diagonal points P1 and P2 of the rectangular region RA including the pupil of the person. Although not shown in the drawing, in a case where the target subject of the target setting information 50 is a person and the target portion is a face or a body, the detection unit 70 inputs the signal for image generation 43N to the person face detection model 76 or the person body detection model 77, and causes the person face detection model 76 or the person body detection model 77 to output the detection result 72.

Figure 12:
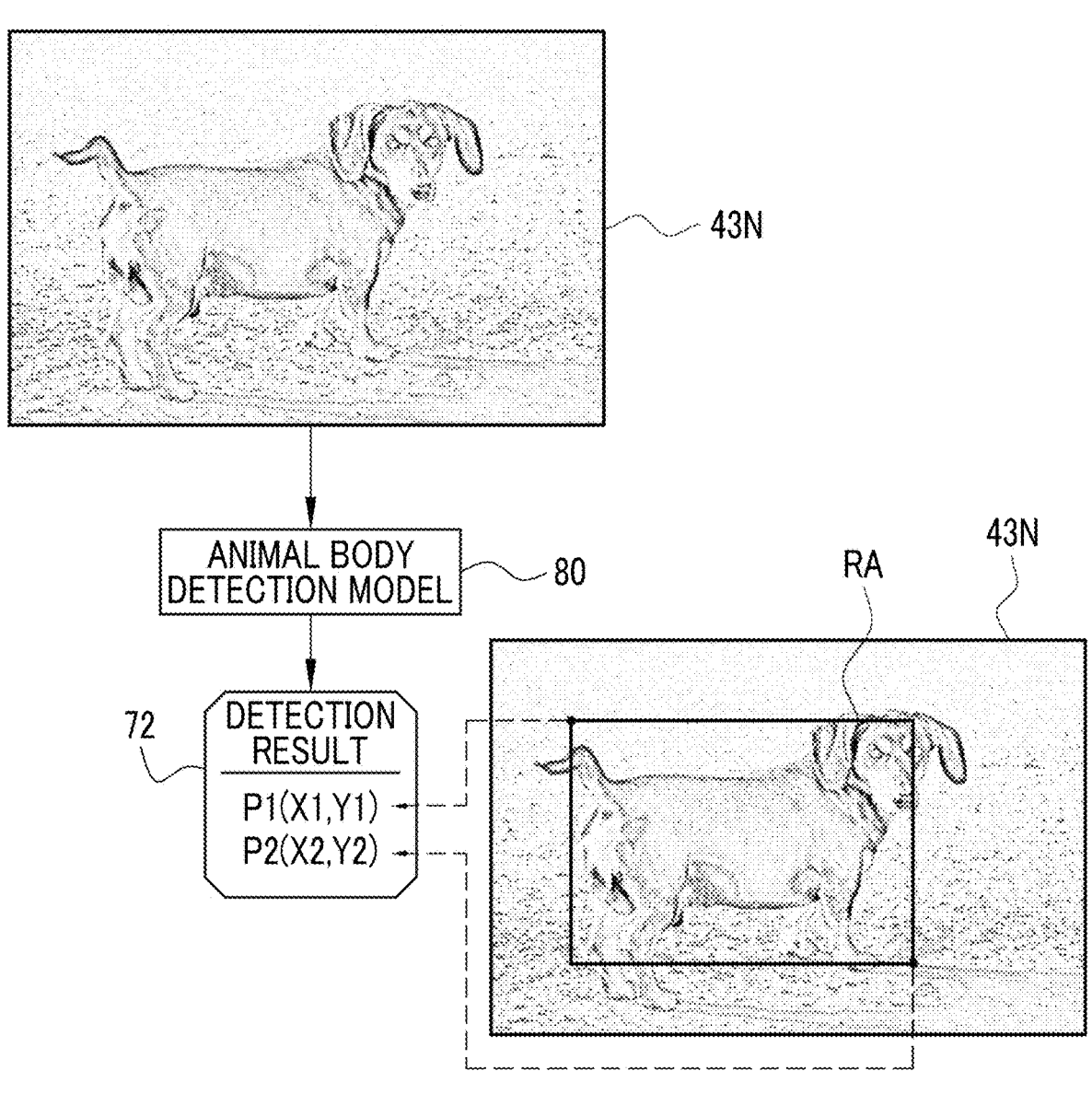
FIG. 12 is a diagram showing, in a case where the target subject is an animal and the target portion is a body, a state in which the body of the animal is detected by using an animal body detection model.

As shown in FIG. 12 as an example, in a case where the target subject of the target setting information 50 is an animal and the target portion is a body, the detection unit 70 inputs the signal for image generation 43N to the animal body detection model 80. In response to the input of the signal for image generation 43N, the animal body detection model 80 outputs the detection result 72 of the rectangular region RA including the body of the animal. The detection result 72 is, for example, XY coordinates of the two diagonal points P1 and P2 of the rectangular region RA including the body of the animal. Although not shown in the drawing, in a case where the target subject of the target setting information 50 is an animal and the target portion is a pupil or a face, the detection unit 70 inputs the signal for image generation 43N to the animal pupil detection model 78 or the animal face detection model 79, and causes the animal pupil detection model 78 or the animal face detection model 79 to output the detection result 72.

Figure 13:
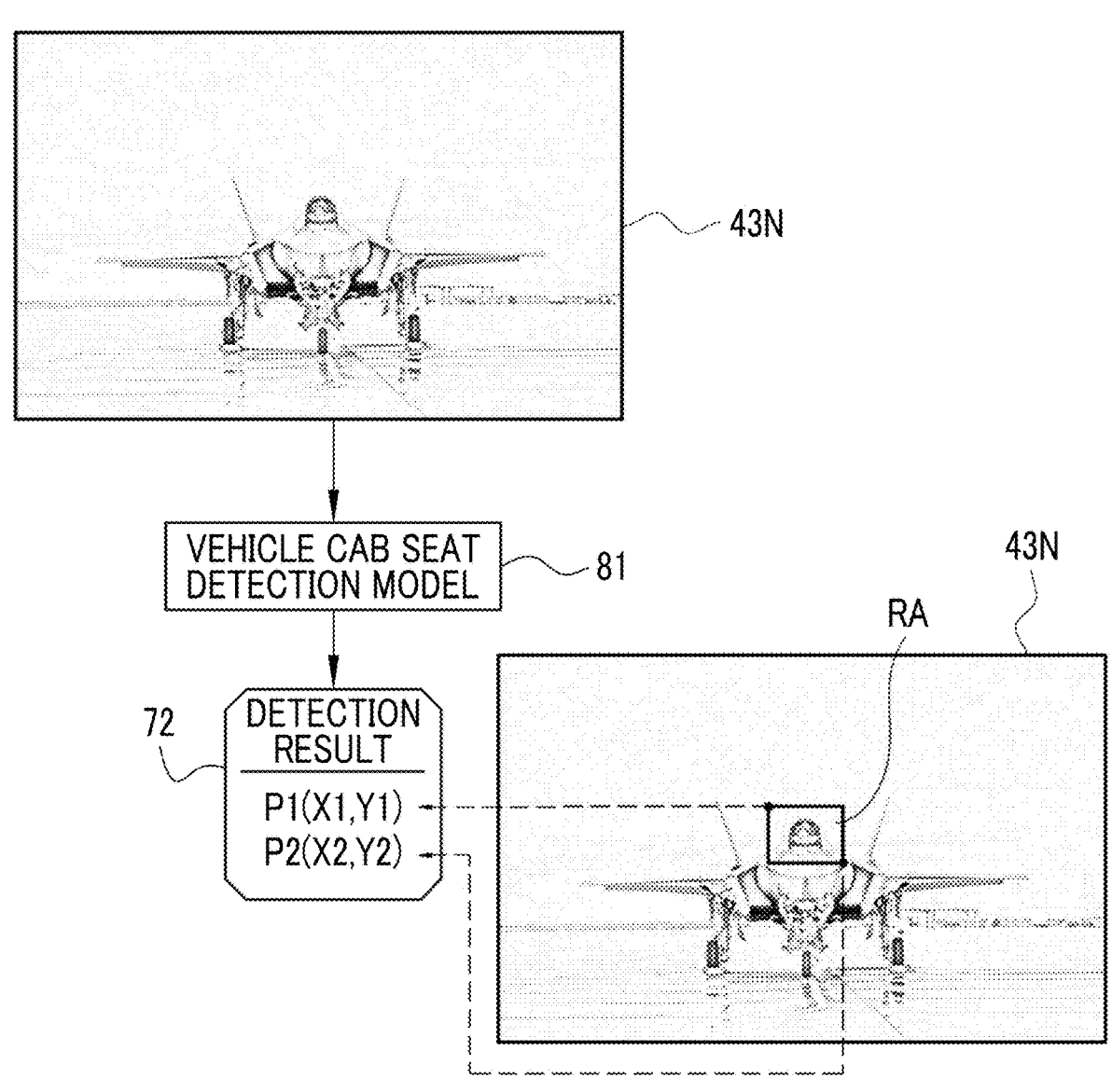
FIG. 13 is a diagram showing, in a case where the target subject is a vehicle and the target portion is a cab seat, a state in which the cab seat of the vehicle is detected by using a vehicle cab seat detection model.

As shown in FIG. 13 as an example, in a case where the target subject of the target setting information 50 is a vehicle and the target portion is a cab seat, the detection unit 70 inputs the signal for image generation 43N to the vehicle cab seat detection model 81. In response to the input of the signal for image generation 43N, the vehicle cab seat detection model 81 outputs the detection result 72 of the rectangular region RA including the cab seat of the vehicle. The detection result 72 is, for example, XY coordinates of the two diagonal points P1 and P2 of the rectangular region RA including the cab seat of the vehicle. Although not shown, in a case where the target subject of the target setting information 50 is a vehicle and the target portion is a head or a body, the detection unit 70 inputs the signal for image generation 43N to the vehicle head detection model 82 or the vehicle body detection model 83, and causes the vehicle head detection model 82 or the vehicle body detection model 83 to output the detection result 72.

In any case of FIGS. 11 to 13, the rectangular region RA is made larger than the target portion. Thus, the rectangular region RA includes not only the target portion but also a peripheral portion of the target portion. For example, in a case where the target portion is a pupil, the peripheral portion includes an eyeball constriction (so-called the white eye), an upper eyelid, a lower eyelid, an inner canthus, an outer canthus, and the like (refer to FIG. 11). Further, in a case where the target portion is a body, the peripheral portion includes a part of a face, a part of limbs, a part of a tail, a background, and the like (refer to FIG. 12).

Figure 14:
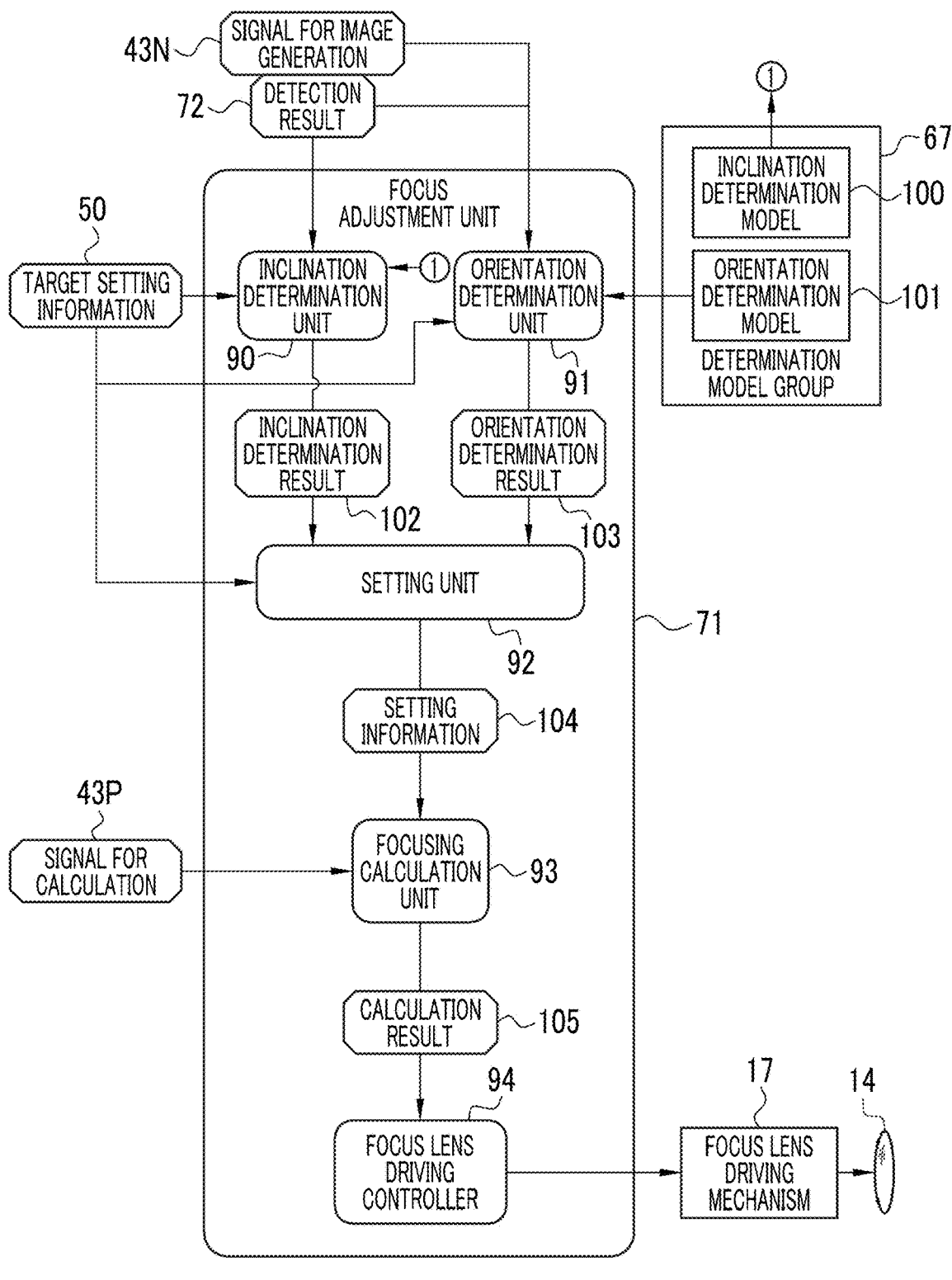
FIG. 14 is a diagram showing a detailed configuration of a focus adjustment unit.

As shown in FIG. 14 as an example, the focus adjustment unit 71 comprises an inclination determination unit 90, an orientation determination unit 91, a setting unit 92, a focusing calculation unit 93, and a focus lens driving controller 94.

The signal for image generation 43N, the target setting information 50, and the detection result 72 are input to the inclination determination unit 90 and the orientation determination unit 91. The inclination determination model 100 of the determination model group 67 is input to the inclination determination unit 90, and the orientation determination model 101 of the determination model group 67 is input to the orientation determination unit 91.

The inclination determination unit 90 operates in a case where the target subject of the target setting information 50 is a person or an animal, and the target portion is a face. Further, the inclination determination unit 90 operates in a case where the target subject of the target setting information 50 is a vehicle. The inclination determination unit 90 specifies the rectangular region RA of the signal for image generation 43N from the detection result 72. The inclination determination unit 90 determines whether or not the target portion is inclined with respect to the rectangular region RA using the inclination determination model 100. The inclination determination unit 90 outputs an inclination determination result 102, which is a determination result of whether or not the target portion is inclined with respect to the rectangular region RA, to the setting unit 92. Whether or not the target portion is inclined with respect to the rectangular region RA may be determined by pattern matching, instead of the inclination determination model 100.

The orientation determination unit 91 operates in a case where the target subject of the target setting information 50 is a vehicle, the target portion is a head or a body, and the inclination determination unit 90 determines that the target portion is not inclined with respect to the rectangular region RA. The orientation determination unit 91 specifies the rectangular region RA of the signal for image generation 43N from the detection result 72. The orientation determination unit 91 determines the orientation of the target subject with respect to the imaging element 12 using the orientation determination model 101. More specifically, the orientation determination unit 91 determines whether or not the target subject faces the front. The orientation determination unit 91 outputs an orientation determination result 103, which is a determination result of whether or not the target subject faces the front, to the setting unit 92. Whether or not the target subject faces the front may be determined by pattern matching, instead of the orientation determination model 101.

The target setting information 50 is input to the setting unit 92. The setting unit 92 sets, based on a combination of the target subject and the target portion of the target setting information 50, a high contribution degree region HCA (refer to FIG. 20) where a degree of contribution to the focusing calculation is higher than other regions in the rectangular region RA. The setting unit 92 outputs setting information 104 of the high contribution degree region HCA to the focusing calculation unit 93.

Figure 15:
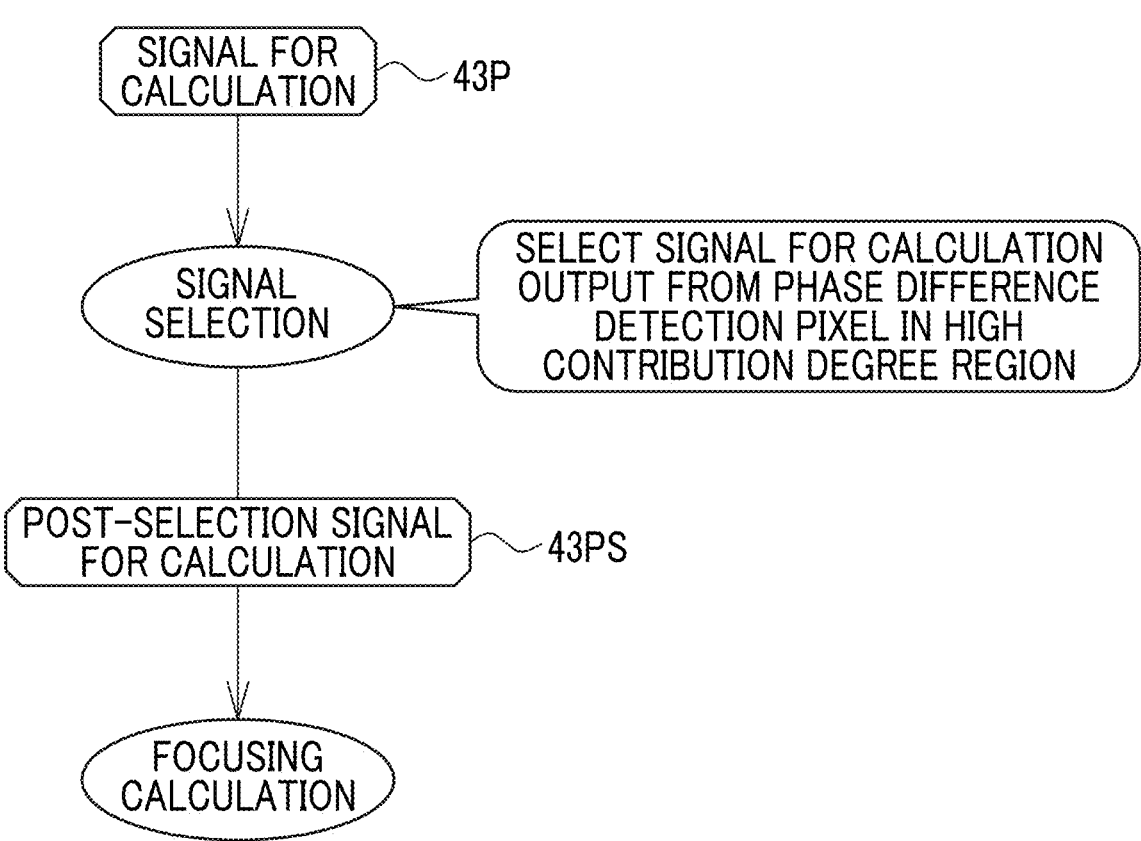
FIG. 15 is a diagram showing processing of a focusing calculation unit in a case where a setting unit sets a high contribution degree region.

The signal for calculation 43P is input to the focusing calculation unit 93. In a case where the setting unit 92 sets the high contribution degree region HCA, the focusing calculation unit 93 performs the focusing calculation in accordance with the setting information 104. Specifically, as shown in FIG. 15 as an example, the focusing calculation unit 93 selects the signal for calculation 43P, which is output from the phase difference detection pixel 41P in the high contribution degree region HCA, among all the signals for calculation 43P, based on the setting information 104. The focusing calculation unit 93 performs the focusing calculation using a post-selection signal for calculation 43PS. That is, the focusing calculation unit 93 performs the focusing calculation using only the high contribution degree region HCA. On the other hand, in a case where the setting unit 92 does not set the high contribution degree region HCA, the focusing calculation unit 93 selects the signal for calculation 43P, which is output from the phase difference detection pixel 41P in the rectangular region RA, among all the signals for calculation 43P, and performs the focusing calculation using the selected signal for calculation 43P. The focusing calculation unit 93 outputs a calculation result 105 of the focusing calculation to the focus lens driving controller 94. The calculation result 105 includes the focusing position of the focus lens 14.

The focus lens driving controller 94 controls the drive of the focus lens driving mechanism 17 and thus the focus lens 14. Specifically, the focus lens driving controller 94 moves the focus lens 14 to the focusing position of the calculation result 105 via the focus lens driving mechanism 17. In a case where a current position of the focus lens 14 is the same as the focusing position of the calculation result 105, the focus lens driving controller 94 does nothing and the focus lens 14 is not moved.

Figure 16:
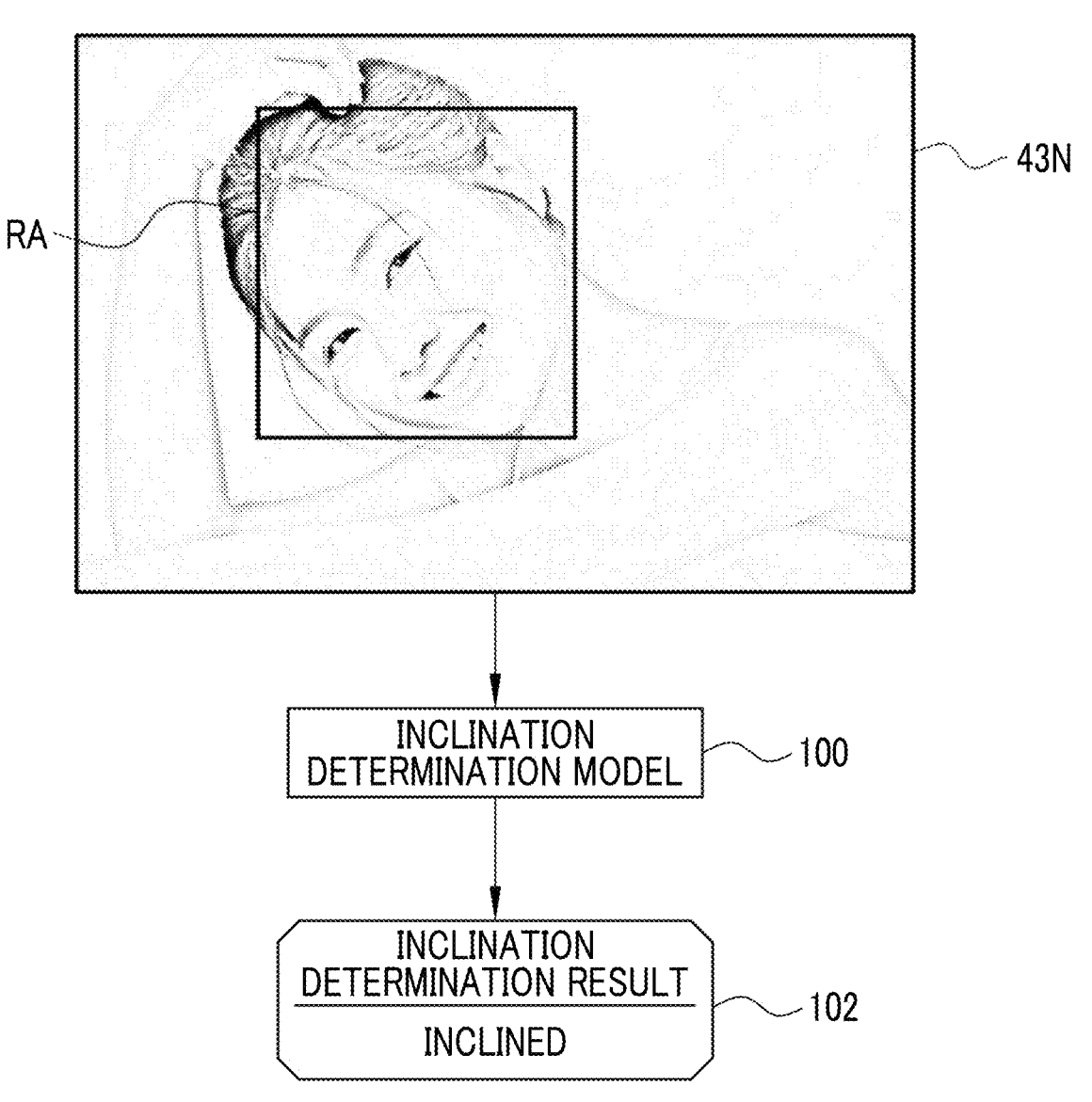
FIG. 16 is a diagram showing, in a case where the target subject is a person and the target portion is a face, a state in which determination is made whether or not the target portion is inclined with respect to a rectangular region by using an inclination determination model.

As shown in FIG. 16 as an example, in a case where the target subject of the target setting information 50 is a person and the target portion is a face, the inclination determination unit 90 inputs the signal for image generation 43N of the rectangular region RA of (the two-dimensional image data represented by) the signal for image generation 43N to the inclination determination model 100. In response to the input of the signal for image generation 43N of the rectangular region RA, the inclination determination model 100 outputs the inclination determination result 102. In FIG. 16, for the sake of convenience, a form is illustrated in which all the signals for image generation 43N are input to the inclination determination model 100. However, in practice, the signal for image generation 43N of the rectangular region RA is input to the inclination determination model 100. The same applies to subsequent FIG. 17.

A content of the inclination determination result 102 indicates "inclined" in a case where the face, which is the target portion, is inclined with respect to the rectangular region RA as shown in the drawing, and indicates "not inclined" in a case where the face, which is the target portion, is not inclined with respect to the rectangular region RA. Here, the description that the target portion is "inclined" with respect to the rectangular region RA is defined as a case where an angle formed by a side of the rectangular region RA in the X direction or a side of the rectangular region RA in the Y direction and a center line of the target portion is, for example, 20° or more. In a case where the target portion is a face, the center line of the target portion is a line that passes through the center of the eyebrows, the nose, and the like, and equally divides the face into left and right sides. Although not shown, in a case where the target subject of the target setting information 50 is an animal and the target portion is a face, similarly, the inclination determination unit 90 inputs the signal for image generation 43N of the rectangular region RA to the inclination determination model 100, and causes the inclination determination model 100 to output the inclination determination result 102.

Figure 17:
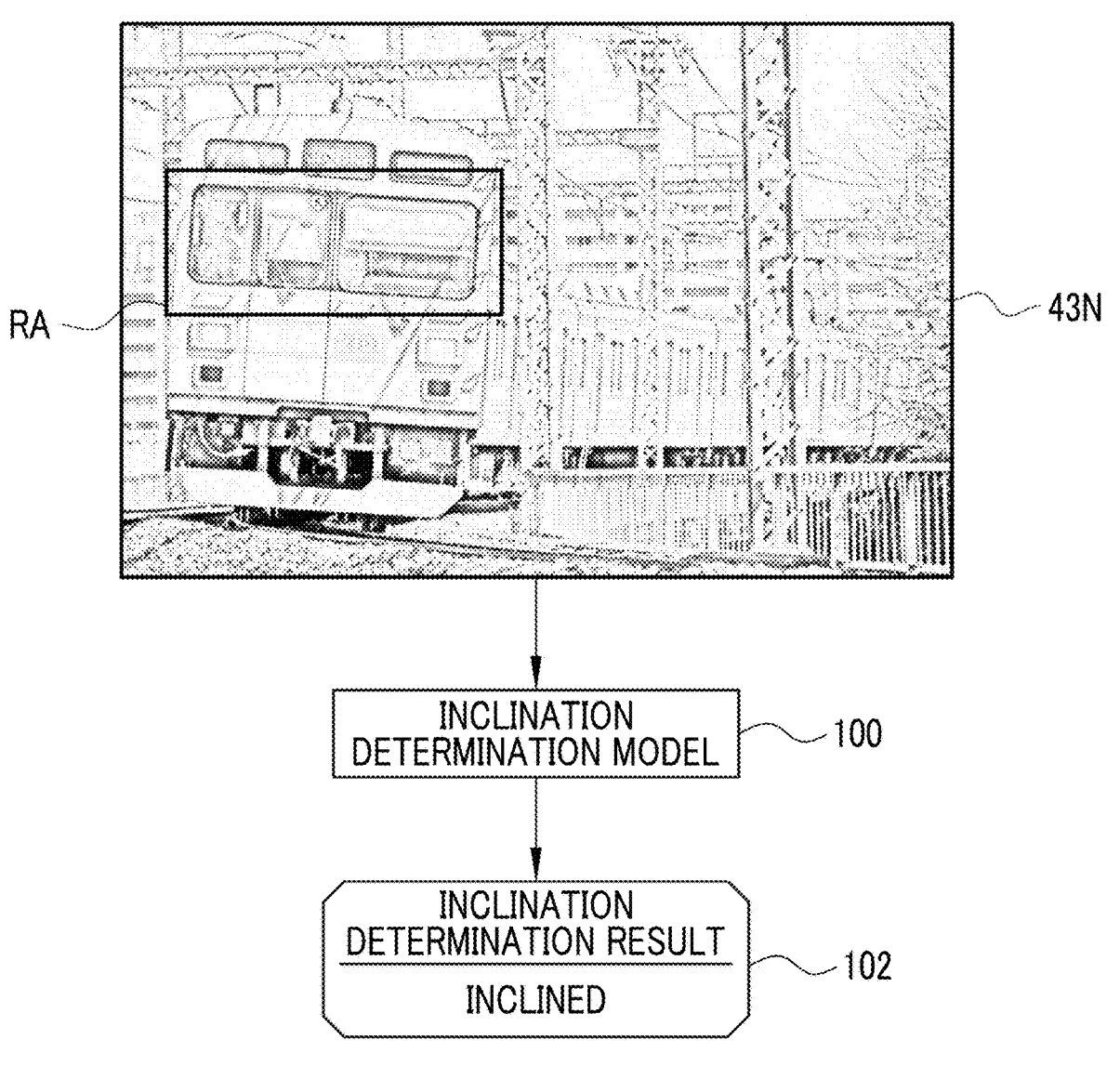
FIG. 17 is a diagram showing, in a case where the target subject is a vehicle and the target portion is a cab seat, a state in which determination is made whether or not the target portion is inclined with respect to the rectangular region by using the inclination determination model.

As shown in FIG. 17 as an example, in a case where the target subject of the target setting information 50 is a vehicle and the target portion is a cab seat, similarly, the inclination determination unit 90 inputs the signal for image generation 43N of the rectangular region RA to the inclination determination model 100, and causes the inclination determination model 100 to output the inclination determination result 102. The center line of the target portion in this case is a line that equally divides the cab seat into left and right sides. Although not shown, similarly, in a case where the target subject of the target setting information 50 is a vehicle and the target portion is a head or a body, similarly, the inclination determination unit 90 inputs the signal for image generation 43N of the rectangular region RA to the inclination determination model 100, and causes the inclination determination model 100 to output the inclination determination result 102.

Figure 18:
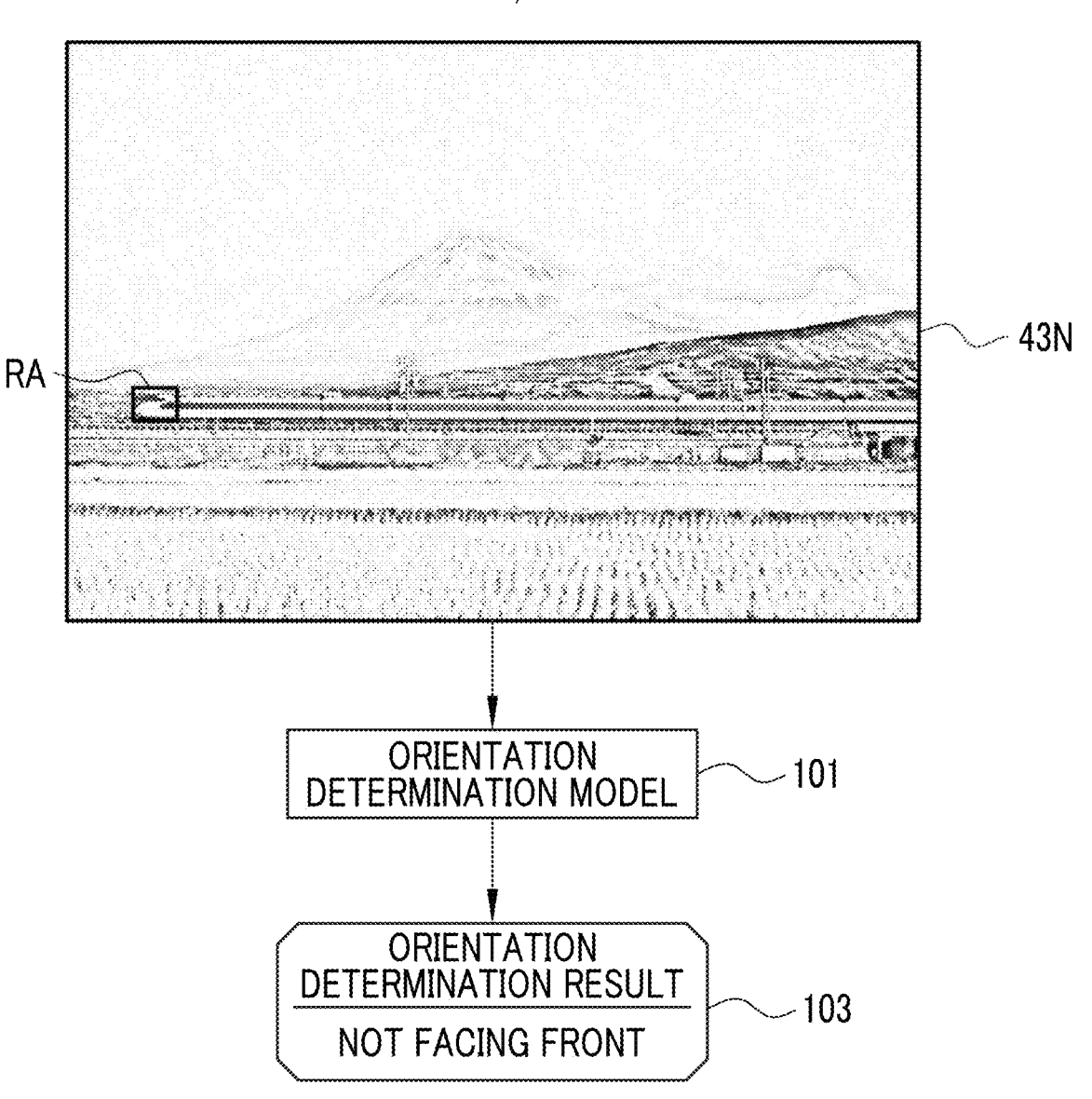
FIG. 18 is a diagram showing, in a case where the target subject is a vehicle and the target portion is a head, a state in which determination is made whether or not the target subject faces a front by using an orientation determination model.

As shown in FIG. 18 as an example, in a case where the target subject of the target setting information 50 is a vehicle, the target portion is a head, and the inclination determination unit 90 determines that the target portion is not inclined with respect to the rectangular region RA, the orientation determination unit 91 inputs the signal for image generation 43N of the rectangular region RA among (the pieces of two-dimensional image data represented by) the signals for image generation 43N to the orientation determination model 101. In response to the input of the signal for image generation 43N of the rectangular region RA, the orientation determination model 101 outputs the orientation determination result 103. In FIG. 18, for the sake of convenience, a form is illustrated in which all the signals for image generation 43N are input to the orientation determination model 101. However, in practice, the signal for image generation 43N of the rectangular region RA is input to the orientation determination model 101. The same applies to subsequent FIG. 19.

A content of the orientation determination result 103 indicates "facing front" in a case where the target subject faces the front, and indicates "not facing front" in a case where the target subject does not face the front as shown in the drawing. Here, the description that the target subject is "not facing front" is defined as a case where the target subject is rotated by 30° or more to any one of upper, lower, left, or right, with a case where the target subject faces directly in the front as 0°.

Figure 19:
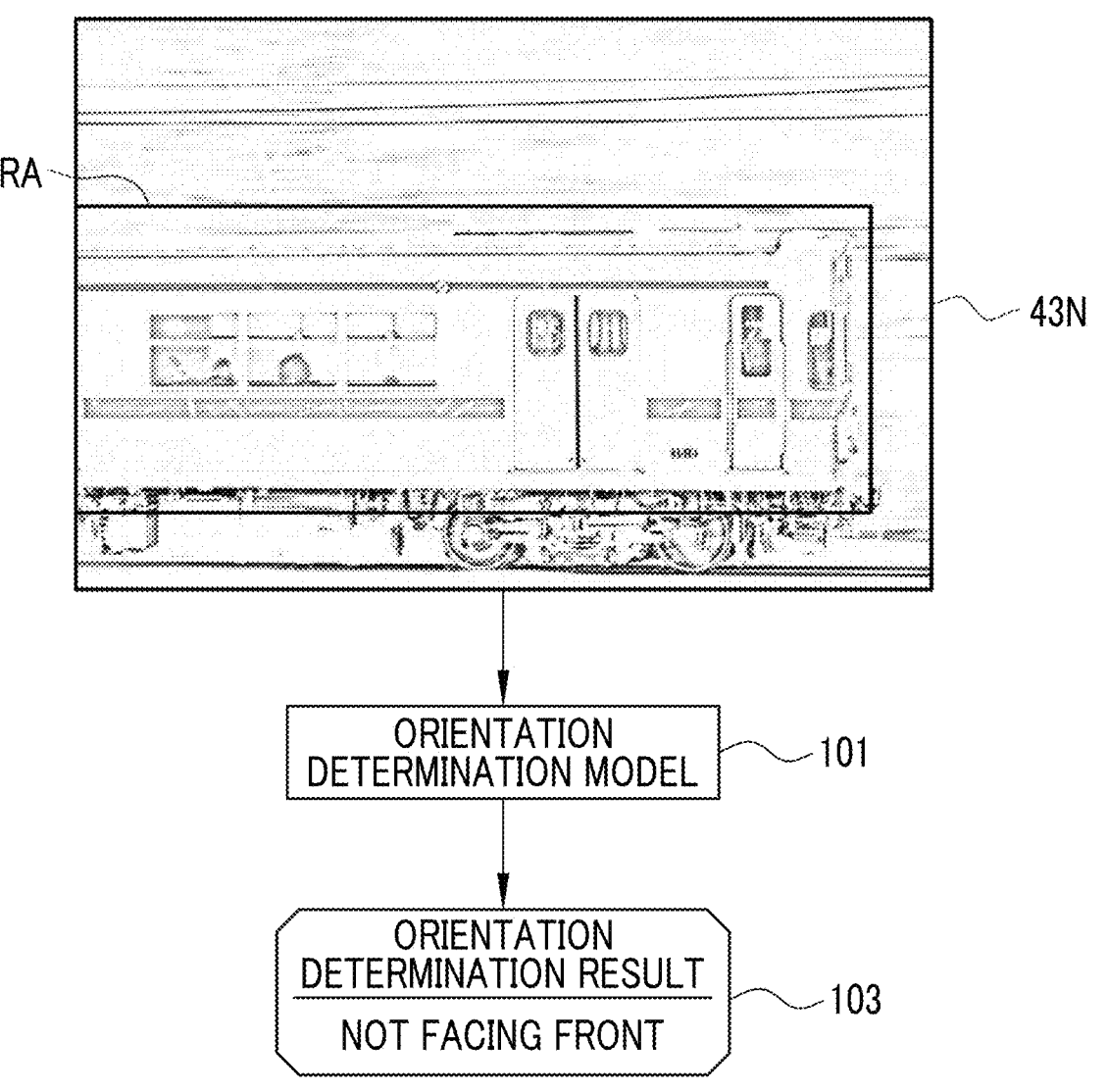
FIG. 19 is a diagram showing, in a case where the target subject is a vehicle and the target portion is a body, a state in which determination is made whether or not the target subject faces the front by using the orientation determination model.

As shown in FIG. 19 as an example, in a case where the target subject of the target setting information 50 is a vehicle, the target portion is a body, and the inclination determination unit 90 determines that the target portion is not inclined with respect to the rectangular region RA, similarly, the orientation determination unit 91 inputs the signal for image generation 43N of the rectangular region RA to the orientation determination model 101, and causes the orientation determination model 101 to output the orientation determination result 103.

As shown in FIG. 20 as an example, the setting unit 92 reduces the region used for the focusing calculation in the focusing calculation unit 93 from the rectangular region RA to the high contribution degree region HCA. FIG. 20 exemplifies a case where the target subject of the target setting information 50 is a person and the target portion is a pupil. In this case, the setting unit 92 reduces the rectangular region RA to the high contribution degree region HCA with reference to a center point of the rectangular region RA. The setting unit 92 outputs XY coordinates of two diagonal points P3 and P4 of the high contribution degree region HCA, as the setting information 104.

A reduction magnification from the rectangular region RA to the high contribution degree region HCA in the X direction is represented as XHC/XR in a case where a length of a side of the rectangular region RA in the X direction is XR and a length of a side of the high contribution degree region HCA in the X direction is XHC. Further, the reduction magnification from the rectangular region RA to the high contribution degree region HCA in the Y direction is represented as YHC/YR in a case where a length of a side of the rectangular region RA in the Y direction is YR and a length of a side of the high contribution degree region HCA in the Y direction is YHC. In a case where the target subject of the target setting information 50 is a person and the target portion is a pupil, the setting unit 92 sets the reduction magnification YHC/YR of the high contribution degree region HCA in the Y direction to be smaller than the reduction magnification XHC/XR in the X direction (XHC/XR>YHC/YR). In other words, the setting unit 92 sets the high contribution degree region HCA by reducing the rectangular region RA more in the Y direction than in the X direction. That is, the setting unit 92 makes the reduction magnification of the high contribution degree region HCA in the X direction and the reduction magnification of the high contribution degree region HCA in the Y direction different from each other.

Figure 21:
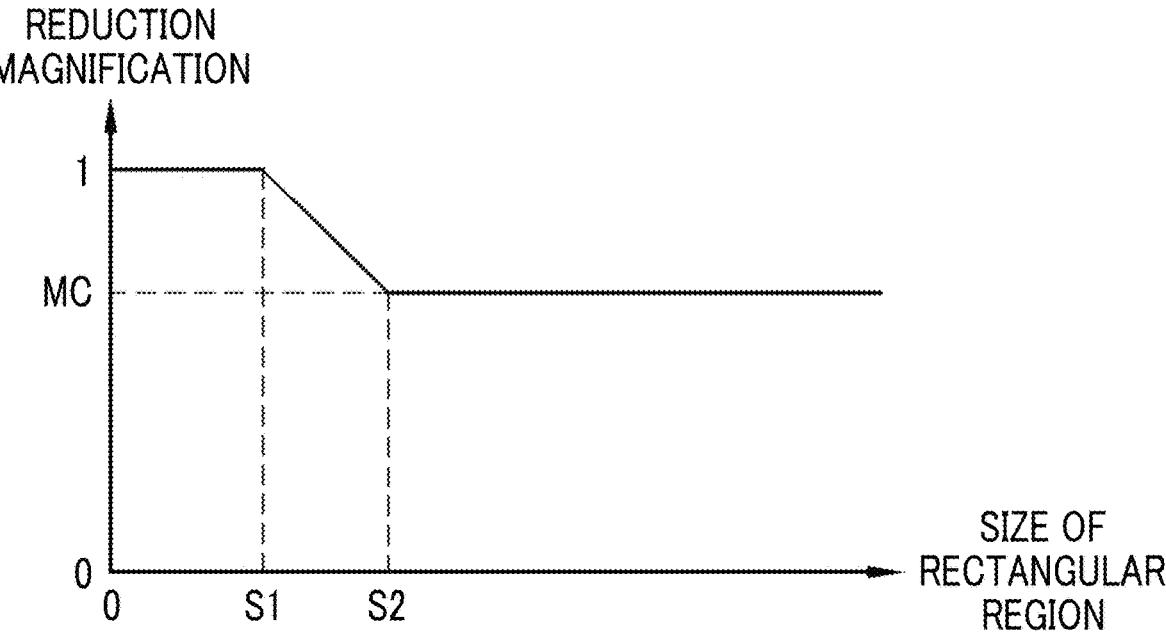
FIG. 21 is a graph showing a relationship between a size of the rectangular region and a reduction magnification.

Further, as shown in a graph in FIG. 21 as an example, the setting unit 92 changes the reduction magnification of the high contribution degree region HCA in accordance with the size of the rectangular region RA. More specifically, in a case where the size of the rectangular region RA is equal to or larger than zero and less than S1, the setting unit 92 sets the reduction magnification of the high contribution degree region HCA to one. The setting of the reduction magnification to one means that no reduction is performed. In a case where the size of the rectangular region RA is equal to or larger than S1 and less than S2, the setting unit 92 sets the reduction magnification of the high contribution degree region HCA to a value that is gradually decreased from one.

In a case where the size of the rectangular region RA is equal to or larger than S2, the setting unit 92 sets the reduction magnification of the high contribution degree region HCA to MC.

In the display of the live view image, S1 is a minimum size of the rectangular region RA that the user can notice that the peripheral portion is focused instead of the target portion. For this reason, in a case where the size of the rectangular region RA is equal to or larger than zero and less than S1, the setting unit 92 sets the reduction magnification of the high contribution degree region HCA to one and does not reduce the rectangular region RA. S2 is a maximum size of the rectangular region RA in a state in which a probability that the focusing calculation based on the reduced high contribution degree region HCA is out of focus is less than a preset threshold value. MC is the reduction magnification in a case where the size of the rectangular region RA is S2 described above.

A relationship between the size of the rectangular region RA and the reduction magnification is prepared for each of the X direction and the Y direction, and stored in the storage 55. Further, the relationship between the size of the rectangular region RA and the reduction magnification is prepared for each combination of the target subject and the target portion, and stored in the storage 55. In the relationship between the size of the rectangular region RA for each direction and the reduction magnification, the reduction magnification may be different in the X direction and the Y direction, or a size of the index value, such as S1, S2, or MC, may be different. Further, in the relationship between the size of the rectangular region RA for each combination of the target subject and the target portion and the reduction magnification, the reduction magnification may be different depending on the combination of the target subject and the target portion, or the size of the index value, such as S1, S2, or MC, may be different.

Figure 22:
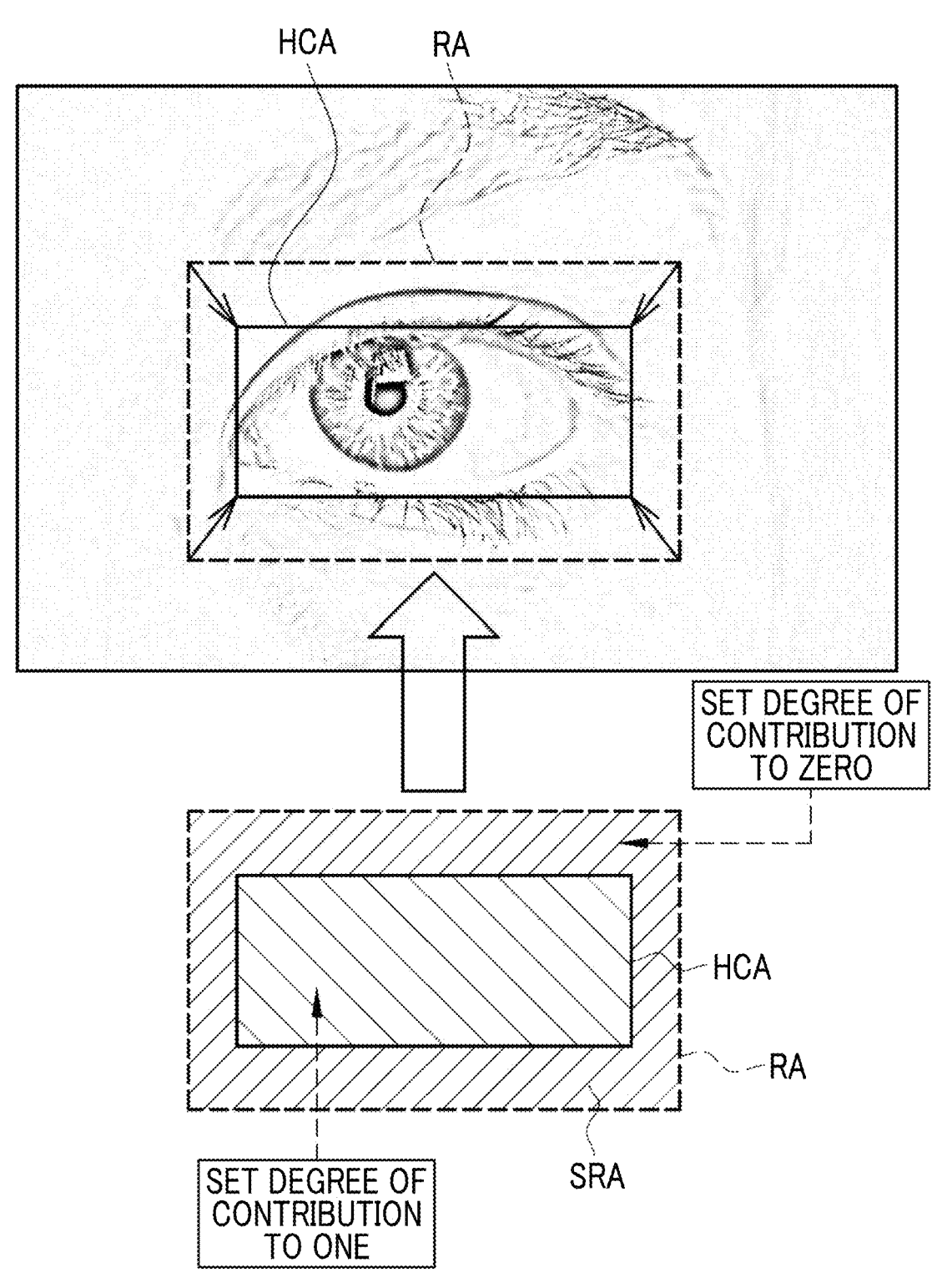
FIG. 22 is an explanatory diagram in a case where reducing the rectangular region to the high contribution degree region is replaced with setting of a degree of contribution.

As described above, with the application of the reduction magnification according to the relationship between the size of the rectangular region RA and the reduction magnification shown in FIG. 21 to the rectangular region RA, the setting unit 92 reduces the rectangular region RA to the high contribution degree region HCA. In a case where the setting of the reduction magnification is replaced with the setting of the degree of contribution, an example is shown in FIG. 22. That is, the setting unit 92 sets the degree of contribution of the high contribution degree region HCA to a maximum value of one. Further, the setting unit 92 sets the degree of contribution of a square annular region SRA obtained by excluding the high contribution degree region HCA from the rectangular region RA to a minimum value of zero. The setting of the degree of contribution of the high contribution degree region HCA to one and the degree of contribution of the square annular region SRA to zero in this manner is synonymous with the reduction of the rectangular region RA to the high contribution degree region HCA. The square annular region SRA is an example of "other regions" according to the technique of the present disclosure.

Figure 23:
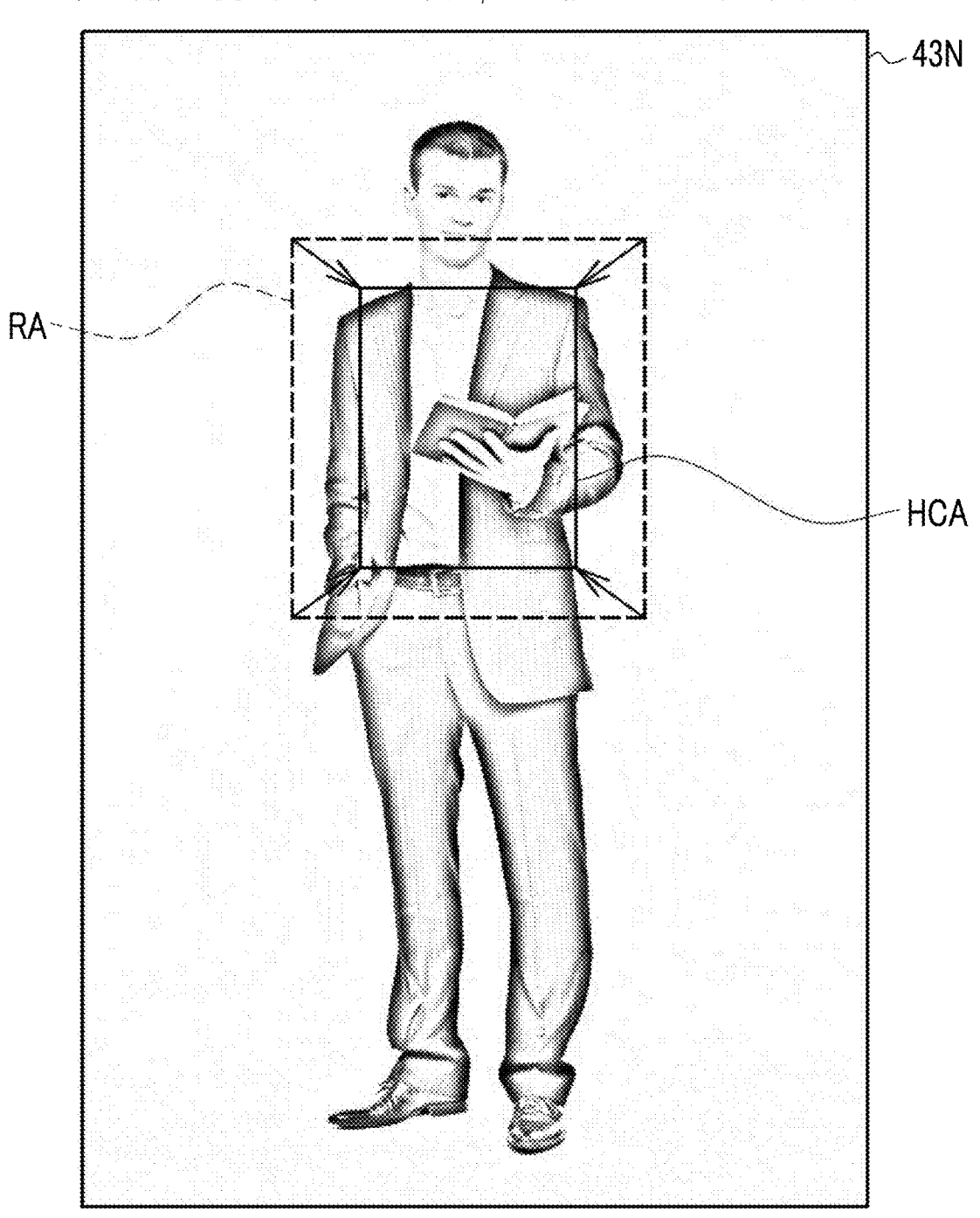
FIG. 23 is a diagram showing the rectangular region and the high contribution degree region in a case where the target subject is a person and the target portion is a body.
Figure 24:
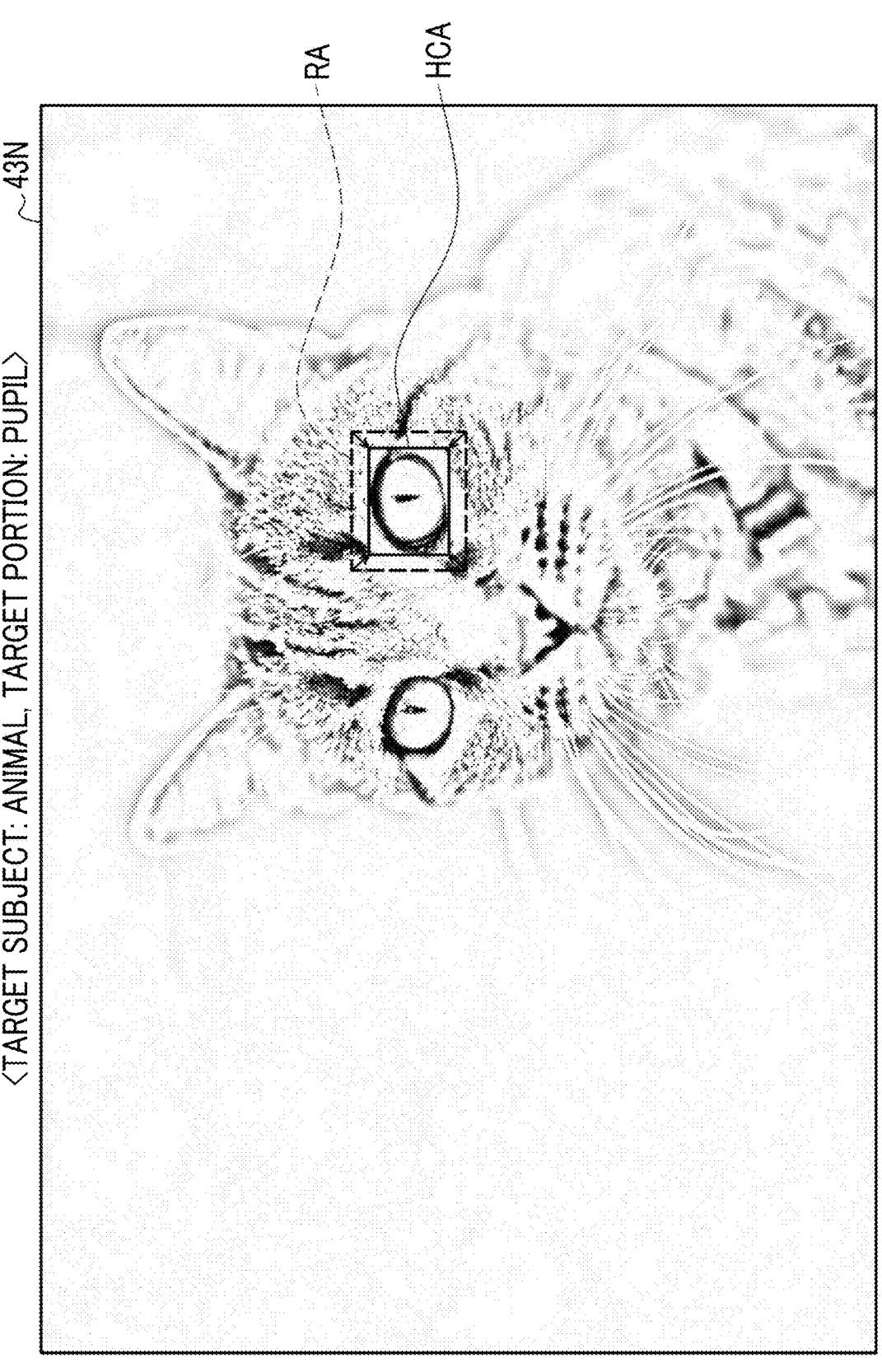
FIG. 24 is a diagram showing the rectangular region and the high contribution degree region in a case where the target subject is an animal and the target portion is a pupil.
Figure 25:
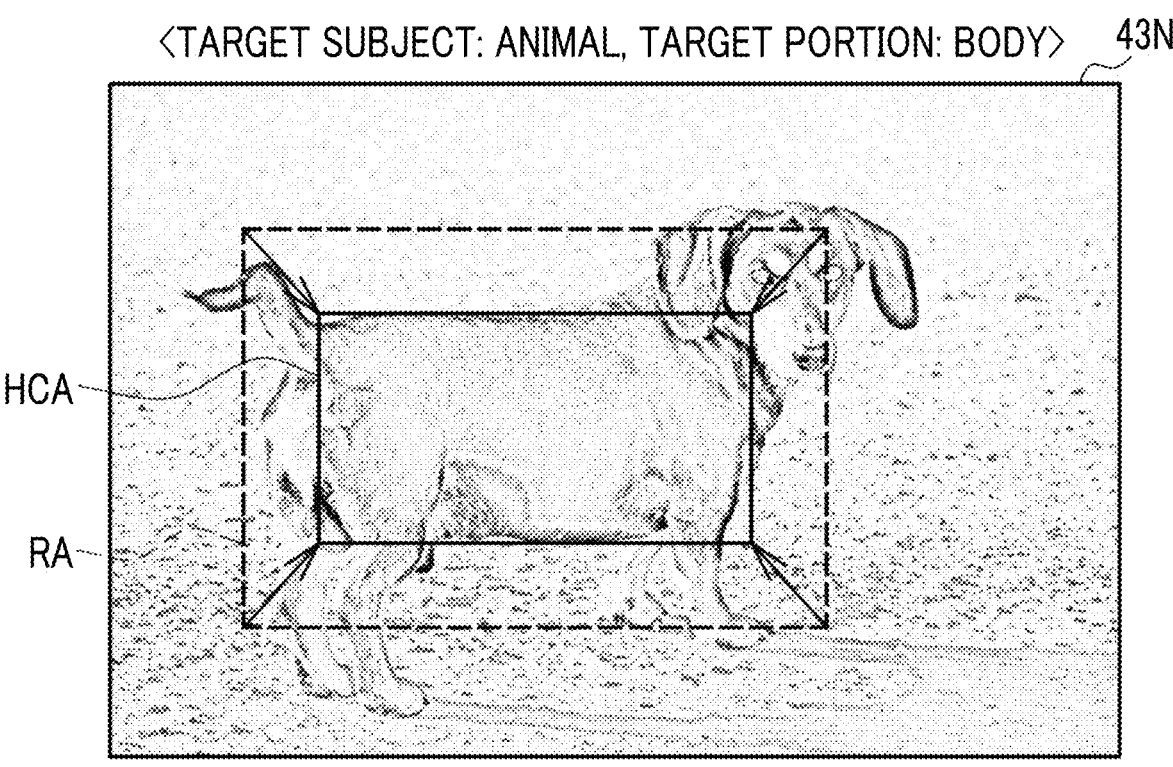
FIG. 25 is a diagram showing the rectangular region and the high contribution degree region in a case where the target subject is an animal and the target portion is a body.

As an example, FIGS. 23 to 25 show the rectangular region RA and the high contribution degree region HCA in various combinations of the target subject and the target portion. FIG. 23 exemplifies a case where the target subject of the target setting information 50 is a person and the target portion is a body. In this case as well, as in the case of FIG. 20, the setting unit 92 reduces the rectangular region RA to the high contribution degree region HCA with reference to the center point of the rectangular region RA. However, in this case, contrary to the case of FIG. 20, the setting unit 92 sets the reduction magnification of the high contribution degree region HCA in the X direction to be smaller than the reduction magnification in the Y direction, and sets the high contribution degree region HCA by reducing the rectangular region RA more in the X direction than in the Y direction.

FIG. 24 exemplifies a case where the target subject of the target setting information 50 is an animal and the target portion is a pupil. In this case as well, as in the case of FIG. 20, the setting unit 92 reduces the rectangular region RA to the high contribution degree region HCA with reference to the center point of the rectangular region RA. Further, as in the case of FIG. 20, the setting unit 92 sets the reduction magnification of the high contribution degree region HCA in the Y direction to be smaller than the reduction magnification in the X direction, and sets the high contribution degree region HCA by reducing the rectangular region RA more in the Y direction than in the X direction.

FIG. 25 exemplifies a case where the target subject of the target setting information 50 is an animal and the target portion is a body. In this case as well, as in the case of FIG. 20, the setting unit 92 reduces the rectangular region RA to the high contribution degree region HCA with reference to the center point of the rectangular region RA. Further, as in the case of FIG. 20, the setting unit 92 sets the reduction magnification of the high contribution degree region HCA in the Y direction to be smaller than the reduction magnification in the X direction, and sets the high contribution degree region HCA by reducing the rectangular region RA more in the Y direction than in the X direction.

Figure 26:
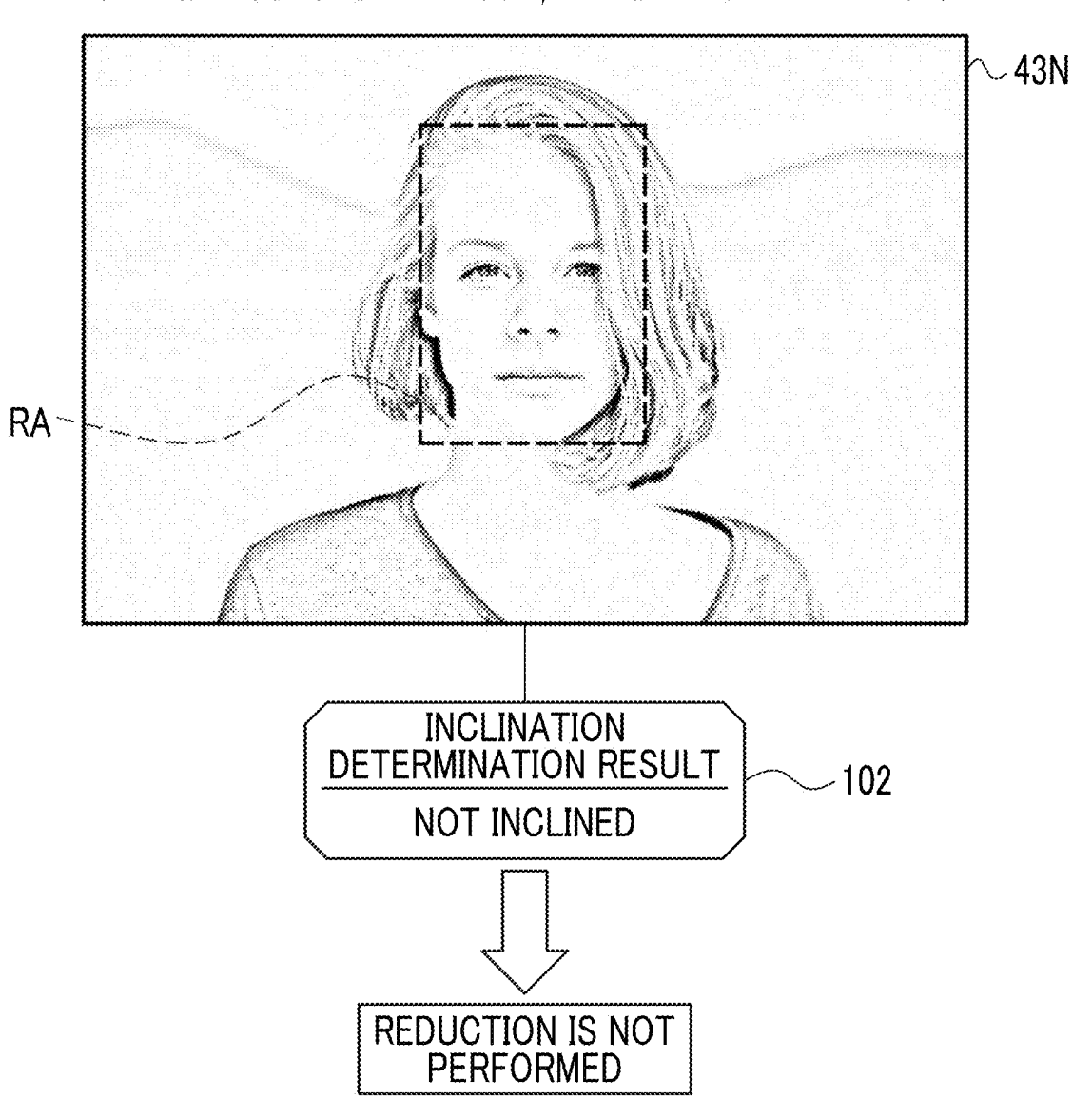
FIG. 26 is a diagram showing processing of the setting unit in a case where the target subject is a person, the target portion is a face, and an inclination determination unit determines that the target portion is not inclined with respect to the rectangular region.
Figure 27:
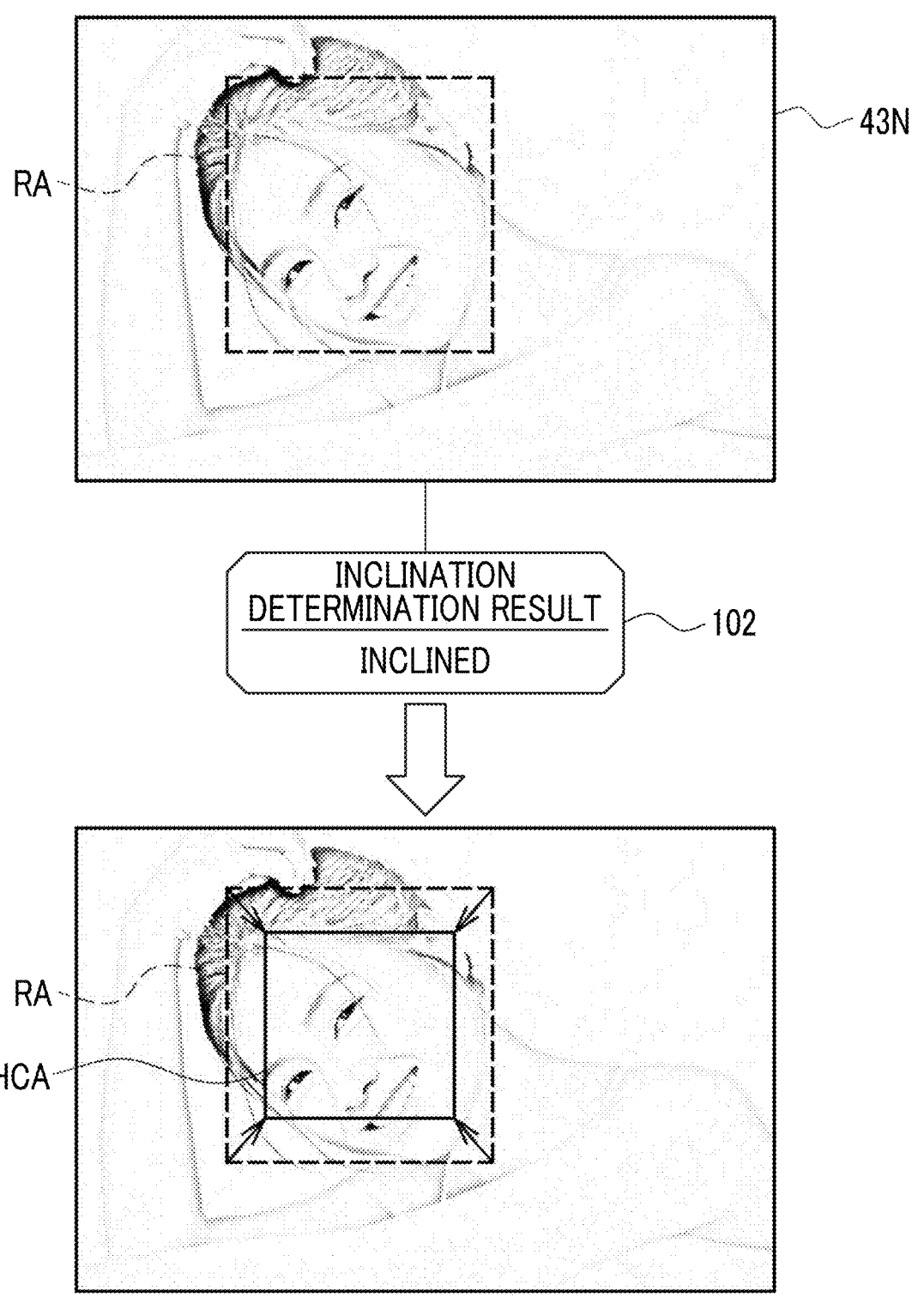
FIG. 27 is a diagram showing processing of the setting unit in a case where the target subject is a person, the target portion is a face, and the inclination determination unit determines that the target portion is inclined with respect to the rectangular region.

As shown in FIG. 26 as an example, in a case where the target subject of the target setting information 50 is a person, the target portion is a face, and the inclination determination unit 90 determines that the target portion is not inclined with respect to the rectangular region RA, the setting unit 92 does not reduce the rectangular region RA to the high contribution degree region HCA. On the other hand, as shown in FIG. 27 as an example, in a case where the target subject of the target setting information 50 is a person, the target portion is a face, and the inclination determination unit 90 determines that the target portion is inclined with respect to the rectangular region RA, the setting unit 92 reduces the rectangular region RA to the high contribution degree region HCA.

Figure 28:
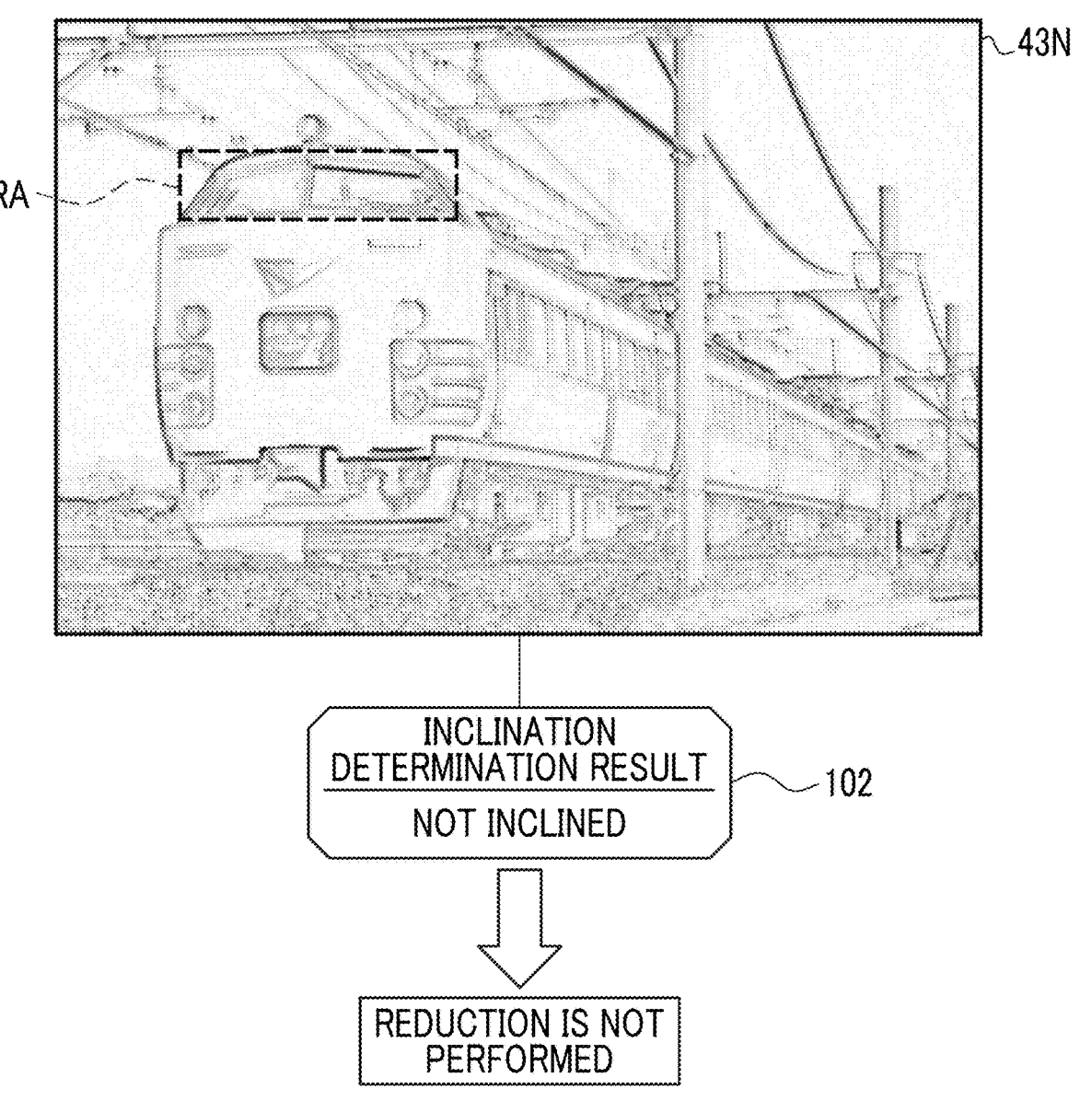
FIG. 28 is a diagram showing processing of the setting unit in a case where the target subject is a vehicle, the target portion is a cab seat, and the inclination determination unit determines that the target portion is not inclined with respect to the rectangular region.
Figure 29:
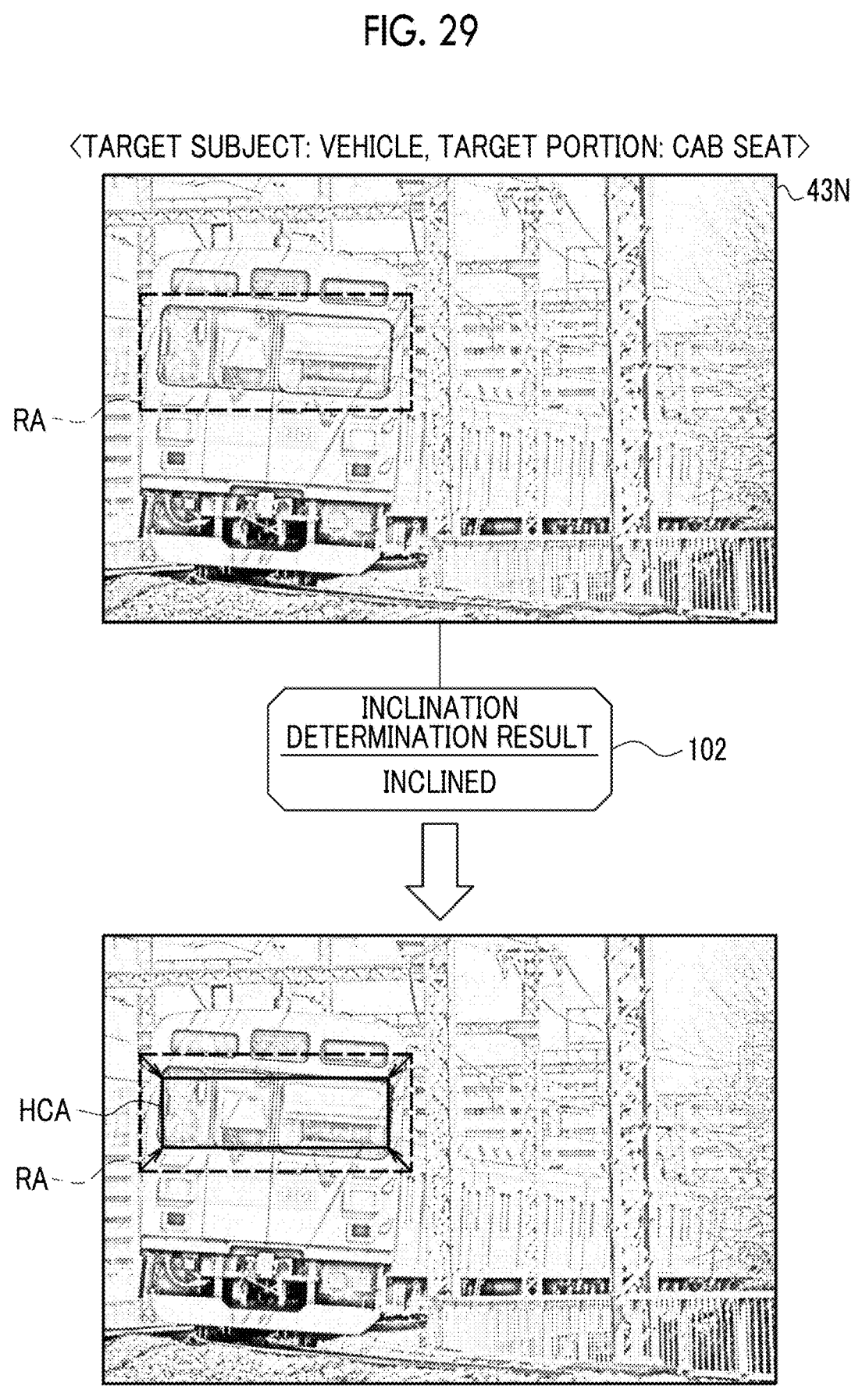

Further, as shown in FIG. 28 as an example, in a case where the target subject of the target setting information 50 is a vehicle, the target portion is a cab seat, and the inclination determination unit 90 determines that the target portion is not inclined with respect to the rectangular region RA, the setting unit 92 does not reduce the rectangular region RA to the high contribution degree region HCA. On the other hand, as shown in FIG. 29 as an example, in a case where the target subject of the target setting information 50 is a vehicle, the target portion is a cab seat, and the inclination determination unit 90 determines that the target portion is inclined with respect to the rectangular region RA, the setting unit 92 reduces the rectangular region RA to the high contribution degree region HCA. As described above, the setting unit 92 controls the reduction of the rectangular region RA in accordance with the inclination of the target portion with respect to the rectangular region RA. More specifically, the setting unit 92 decides whether or not to perform the reduction of the rectangular region RA to the high contribution degree region HCA based on whether or not the target portion is inclined with respect to the rectangular region RA.

Figure 31:
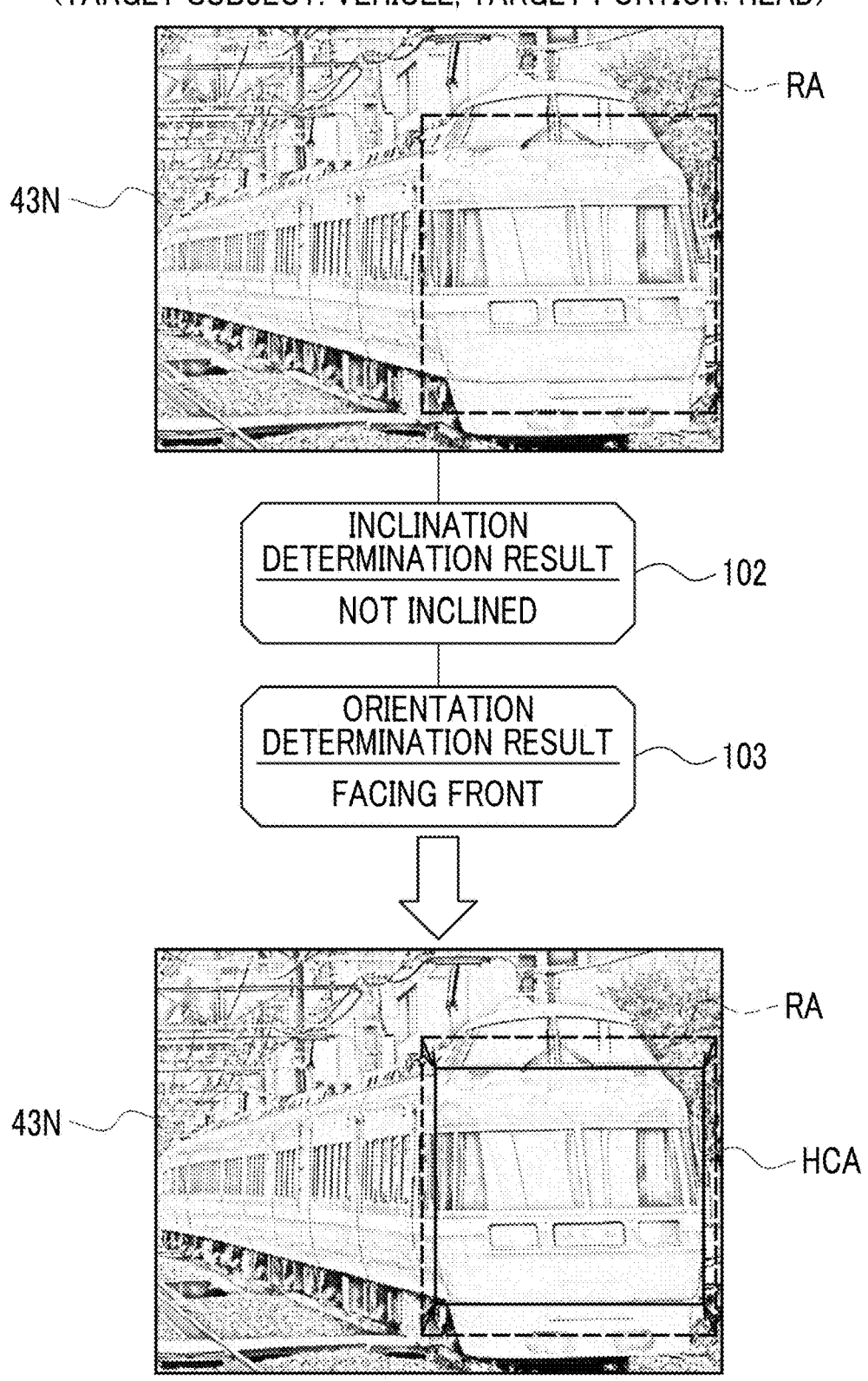
FIG. 31 is a diagram showing processing of the setting unit in a case where the target subject is a vehicle, the target portion is a head, the inclination determination unit determines that the target portion is not inclined with respect to the rectangular region, and further, the orientation determination unit determines that the target subject faces the front.

As shown in FIG. 30 as an example, in a case where the target subject of the target setting information 50 is a vehicle, the target portion is a head, the inclination determination unit 90 determines that the target portion is not inclined with respect to the rectangular region RA, and further, the orientation determination unit 91 determines that the target subject does not face the front, the setting unit 92 does not reduce the rectangular region RA to the high contribution degree region HCA. On the other hand, as shown in FIG. 31 as an example, in a case where the target subject of the target setting information 50 is a vehicle, the target portion is a head, the inclination determination unit 90 determines that the target portion is not inclined with respect to the rectangular region RA, and further, the orientation determination unit 91 determines that the target subject faces the front, the setting unit 92 reduces the rectangular region RA to the high contribution degree region HCA.

Figure 32:
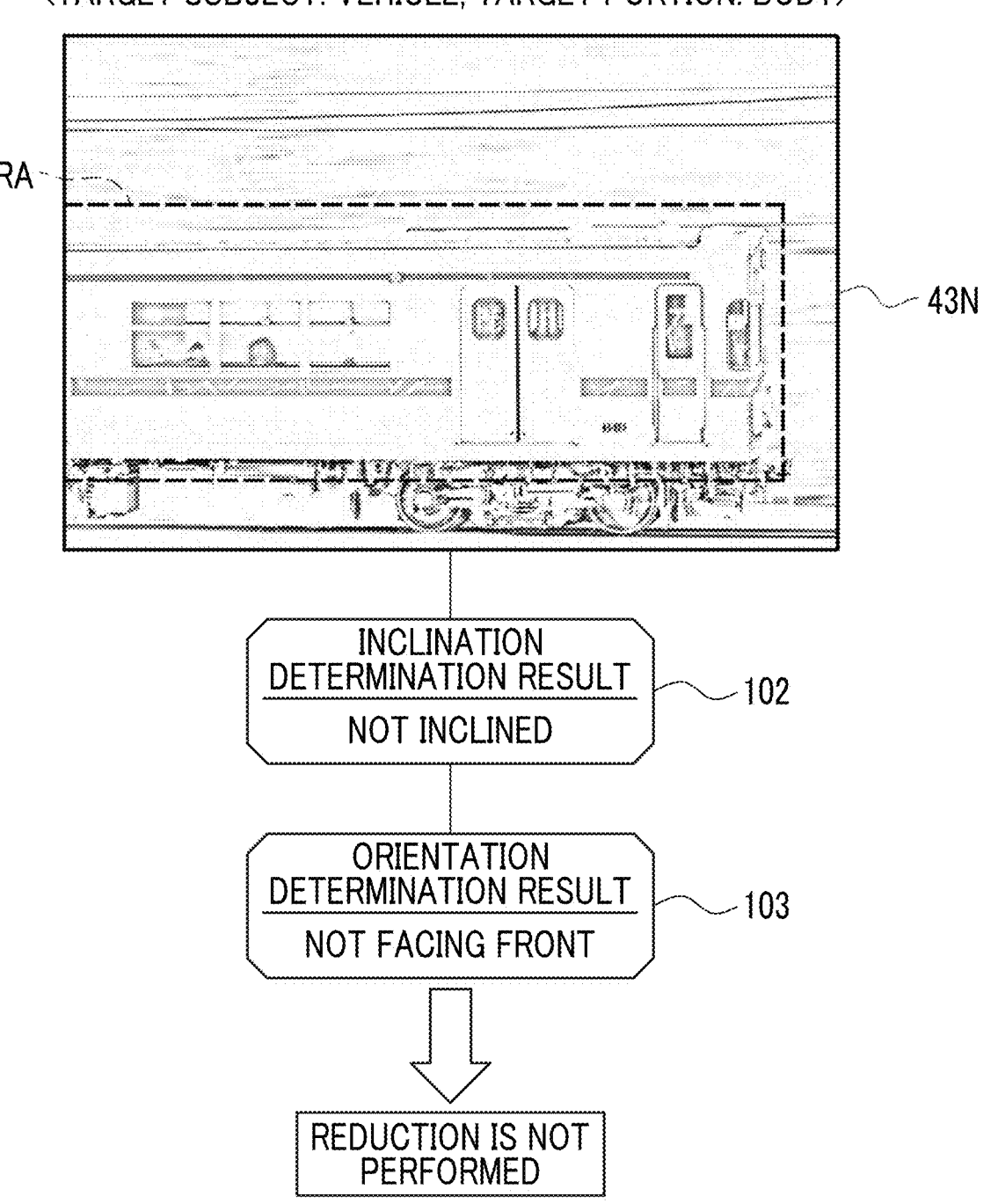
FIG. 32 is a diagram showing processing of the setting unit in a case where the target subject is a vehicle, the target portion is a body, the inclination determination unit determines that the target portion is not inclined with respect to the rectangular region, and further, the orientation determination unit determines that the target subject does not face the front.

As shown in FIG. 32 as an example, in a case where the target subject of the target setting information 50 is a vehicle, the target portion is a body, the inclination determination unit 90 determines that the target portion is not inclined with respect to the rectangular region RA, and further, the orientation determination unit 91 determines that the target subject does not face the front, the setting unit 92 does not reduce the rectangular region RA to the high contribution degree region HCA. As described above, the setting unit 92 controls the reduction of the rectangular region RA according to the orientation of the target subject with respect to the imaging element 12. More specifically, the setting unit 92 decides whether or not to perform the reduction of the rectangular region RA to the high contribution degree region HCA based on whether or not the target subject faces the front.

Figure 33:
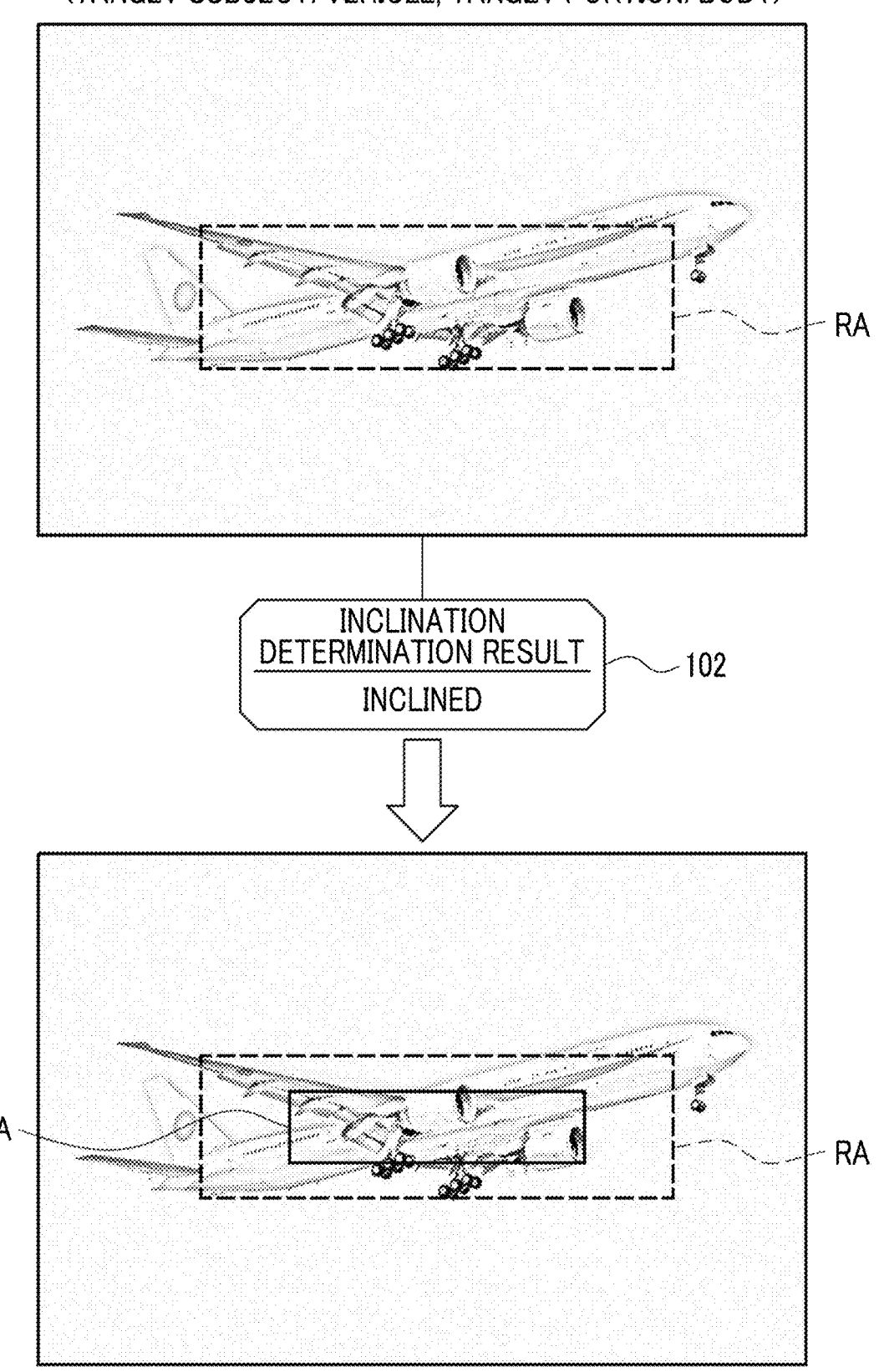
FIG. 33 is a diagram showing processing of the setting unit in a case where the target subject is a vehicle, the target portion is a body, and the inclination determination unit determines that the target portion is inclined with respect to the rectangular region.

As shown in FIG. 33 as an example, in a case where the target subject of the target setting information 50 is a vehicle, the target portion is a body, and the inclination determination unit 90 determines that the target portion is inclined with respect to the rectangular region RA, the setting unit 92 reduces the rectangular region RA to the high contribution degree region HCA.

Next, an action of the above configuration will be described with reference to flowcharts shown in FIGS. 34 and 35 as an example. As shown in FIG. 9, the CPU 56 functions as the detection unit 70 and the focus adjustment unit 71 with the start of the operation program 65. As shown in FIG. 14, the focus adjustment unit 71 functions as the inclination determination unit 90, the orientation determination unit 91, the setting unit 92, the focusing calculation unit 93, and the focus lens driving controller 94.

Figure 34:
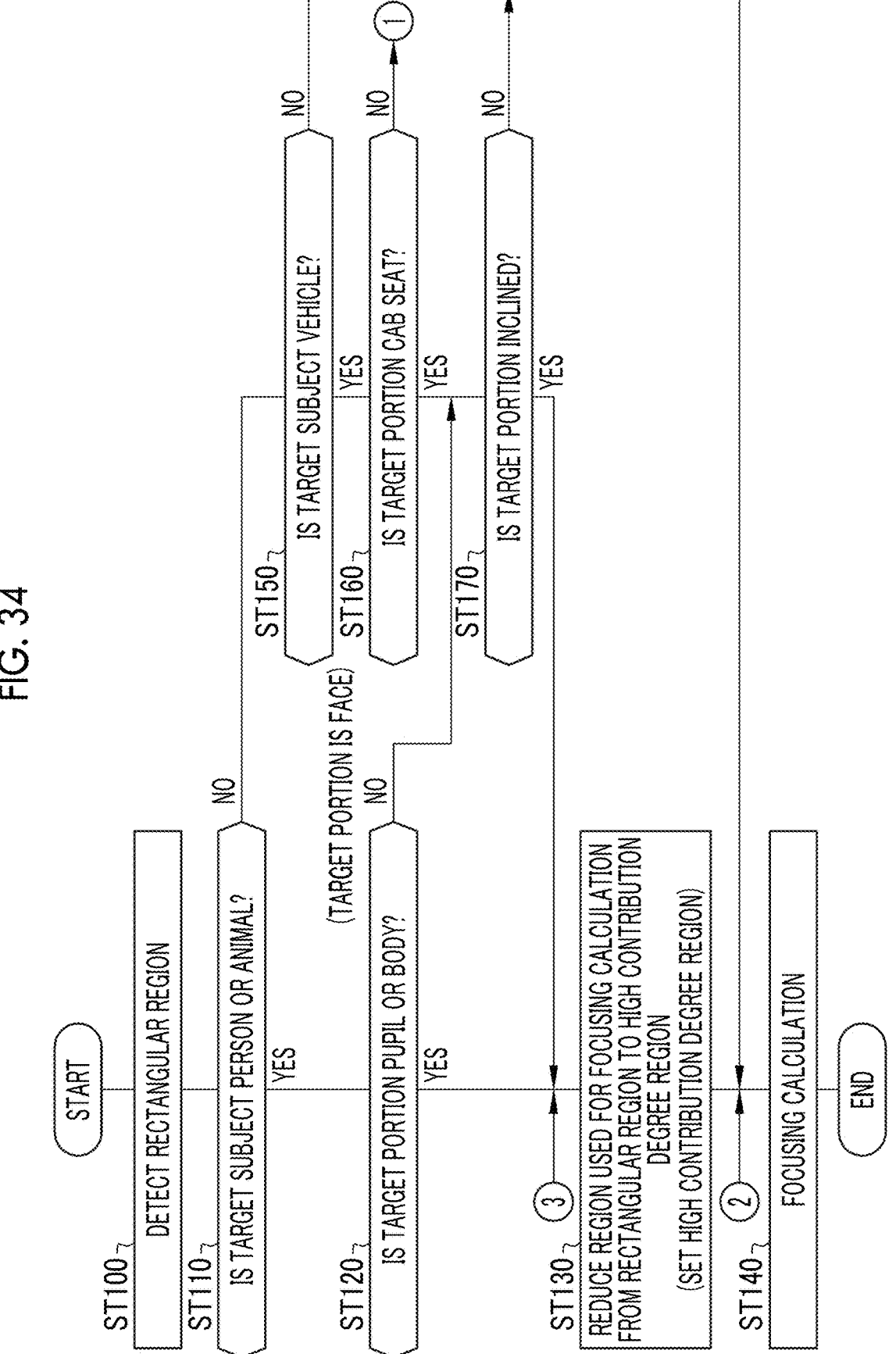
FIG. 34 is a flowchart showing a processing procedure of the CPU.

For example, in the static-image capturing mode or the video imaging mode, in a case where the instruction receiving unit 32 receives the instruction to prepare capturing of a static image or a video in response to the half push operation of the release button, in the detection unit 70, the signal for image generation 43N is input to any detection model of the detection model group 66 corresponding to the target subject and the target portion of the target setting information 50, and the detection result 72 of the rectangular region RA is output from the detection model, as shown in FIGS. 11 to 13 (step ST100 in FIG. 34). The detection result 72 is output from the detection unit 70 to the focus adjustment unit 71.

In a case where the target subject of the target setting information 50 is a person or an animal (YES in step ST110) and the target portion is a pupil or a body (YES in step ST120), the region used for the focusing calculation is reduced from the rectangular region RA to the high contribution degree region HCA in the setting unit 92, as shown in FIG. 20 and FIGS. 23 to 25 (step ST130). The setting information 104 of the high contribution degree region HCA is output to the focusing calculation unit 93. Although not expressed in the flowchart of FIG. 34, the rectangular region RA may not be reduced to the high contribution degree region HCA depending on the size of the rectangular region RA, as shown in FIG. 21.

In a case where the target subject of the target setting information 50 is a person or an animal (YES in step ST110) and the target portion is not a pupil or a body, that is, in a case where the target portion is a face (NO in step ST120), the processing proceeds to step ST170. Further, in a case where the target subject of the target setting information 50 is a vehicle (NO in step ST110 and YES in step ST150) and the target portion is a cab seat (YES in step ST160), the processing proceeds to step ST170.

In step ST170, the inclination determination unit 90 is operated to determine whether or not the target portion is inclined with respect to the rectangular region RA, as shown in FIGS. 16 and 17. In a case where the inclination determination unit 90 determines that the target portion is not inclined with respect to the rectangular region RA (NO in step ST170), the setting unit 92 does not reduce the rectangular region RA to the high contribution degree region HCA, as shown in FIGS. 26 and 28. In this case, the rectangular region RA is set as it is as the region used for the focusing calculation. Also in a case where the target subject of the target setting information 50 is neither a person, an animal, nor a vehicle (NO in step ST110 and NO in step ST150), the setting unit 92 does not reduce the rectangular region RA to the high contribution degree region HCA, and the rectangular region RA is set as it is as the region used for the focusing calculation.

On the other hand, in a case where the inclination determination unit 90 determines that the target portion is inclined with respect to the rectangular region RA (YES in step ST170), the region used for the focusing calculation is reduced from the rectangular region RA to the high contribution degree region HCA in the setting unit 92, as shown in FIGS. 27 and 29 (step ST130). The setting information 104 of the high contribution degree region HCA is output to the focusing calculation unit 93.

Figure 35:
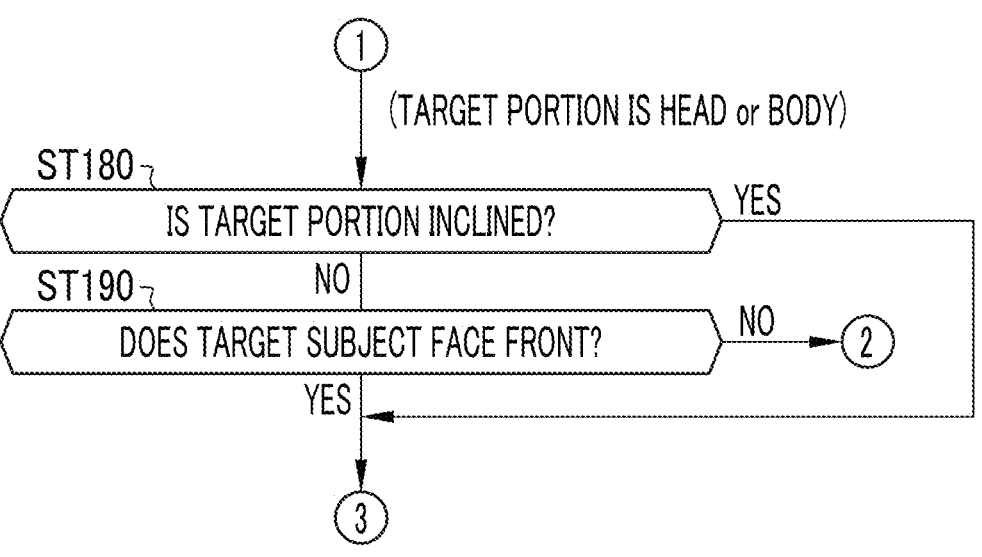
FIG. 35 is a flowchart showing the processing procedure of the CPU.

In a case where the target subject of the target setting information 50 is a vehicle (YES in step ST150) and the target portion is not a cab seat, that is, in a case where the target portion is a head or a body (NO in step ST160), the processing proceeds to step ST180 of FIG. 35.

In step ST180, as in step ST170, the inclination determination unit 90 is operated to determine whether or not the target portion is inclined with respect to the rectangular region RA, as shown in FIGS. 30 to 33. In a case where the inclination determination unit 90 determines that the target portion is not inclined with respect to the rectangular region RA (NO in step ST180), the processing proceeds to step ST190.

In step ST190, the orientation determination unit 91 is operated to determine whether or not the target subject faces the front, as shown in FIGS. 30 to 32. In a case where the target subject does not face the front (NO in step ST190), the setting unit 92 does not reduce the rectangular region RA to the high contribution degree region HCA, and the rectangular region RA is set as it is as the region used for the focusing calculation, as shown in FIGS. 30 and 32. On the other hand, in a case where the target subject faces the front (YES in step ST190), the region used for the focusing calculation is reduced from the rectangular region RA to the high contribution degree region HCA in the setting unit 92, as shown in FIG. 31 (step ST130). The setting information

104 of the high contribution degree region HCA is output to the focusing calculation unit 93.

Further, in a case where the inclination determination unit 90 determines that the target portion is inclined with respect to the rectangular region RA (YES in step ST180), the region used for the focusing calculation is reduced from the rectangular region RA to the high contribution degree region HCA in the setting unit 92, as shown in FIG. 33 (step ST130). The setting information 104 of the high contribution degree region HCA is output to the focusing calculation unit 93.

As shown in FIG. 15, in a case where the high contribution degree region HCA is set, the focusing calculation unit 93 selects the signal for calculation 43P output from the phase difference detection pixel 41P in the high contribution degree region HCA, among the signals for calculation 43P from the image memory 26. The focusing calculation is performed by using the post-selection signal for calculation 43PS (step ST140). On the other hand, in a case where the high contribution degree region HCA is not set, the focusing calculation unit 93 selects the signal for calculation 43P output from the phase difference detection pixel 41P in the rectangular region RA, among the signals for calculation 43P from the image memory 26. The focusing calculation is performed by using the selected signal for calculation 43P (step ST140). The calculation result 105 of the focusing calculation is output from the focusing calculation unit 93 to the focus lens driving controller 94. Specifically, under the control of the focus lens driving controller 94, the focus lens 14 is moved to the focusing position of the calculation result 105 via the focus lens driving mechanism 17.

The processing described above is summarized as shown in a table 110 of FIG. 36 as an example. That is, in a case where the target subject is a person or an animal and the target portion is a pupil of the person, a body of the person, a pupil of the animal, or a body of the animal, the setting unit 92 reduces the rectangular region RA to the high contribution degree region HCA.

In a case where the target subject is a person, an animal, or a vehicle and the target portion is a face of the person, a face of the animal, or a cab seat of the vehicle, the setting unit 92 performs the reduction under a condition. In this case, the condition is whether or not the target portion is inclined with respect to the rectangular region RA. In a case where the target portion is inclined with respect to the rectangular region RA, the setting unit 92 performs the reduction. On the other hand, in a case where the target portion is not inclined with respect to the rectangular region RA, the setting unit 92 does not perform the reduction.

In a case where the target subject is a vehicle and the target portion is a head of the vehicle or a body of the vehicle, the setting unit 92 performs the reduction under a condition. In this case, the condition is whether or not the target portion is inclined with respect to the rectangular region RA and whether or not the target subject faces the front. In a case where the target portion is inclined with respect to the rectangular region RA, the setting unit 92 performs the reduction. Further, in a case where the target portion is not inclined with respect to the rectangular region RA and the target subject faces the front, the setting unit 92 performs the reduction. On the other hand, in a case where the target portion is not inclined with respect to the rectangular region RA and the target subject does not face the front, the setting unit 92 does not perform the reduction.

As described above, the controller 20 as the automatic focus control device performs the focusing calculation that calculates the focusing position of the focus lens 14 based on the signal for calculation 43P read out from the imaging element 12. The CPU 56 comprises the detection unit 70 and the focus adjustment unit 71. The focus adjustment unit 71 comprises the setting unit 92 and the focusing calculation unit 93. The detection unit 70 detects, from the signal for image generation 43N, the rectangular region RA including the target portion of the target subject of the focusing calculation and the peripheral portion of the target portion. The setting unit 92 can set the high contribution degree region HCA where the degree of contribution to the focusing calculation is higher than other regions in the rectangular region RA, based on the combination of the target subject and the target portion. In a case where the high contribution degree region HCA is set, the focusing calculation unit 93 performs the focusing calculation in accordance with the setting. Therefore, it is possible to perform the automatic focus control adapted to the target subject and the target portion of the focusing calculation.

The specific region is the rectangular region RA. Therefore, the specific region is easily detected and easily handled even in subsequent processing. The specific region is not limited to the rectangular region RA and may have, for example, a circular shape, an elliptical shape, or the like.

The setting unit 92 reduces the region used for the focusing calculation from the rectangular region RA to the high contribution degree region HCA. The focusing calculation unit 93 performs the focusing calculation using the reduced high contribution degree region HCA. More specifically, the focusing calculation unit 93 performs the focusing calculation using only the reduced high contribution degree region HCA. In a case where the rectangular region RA is as it is, there is a concern that a lower eyelid may be focused instead of a pupil or a background may be focused instead of a body. However, such a concern can be reduced.

As shown in FIG. 20 and the like, the setting unit 92 makes the reduction magnification in the X direction and the reduction magnification in the Y direction of the high contribution degree region HCA different from each other. Therefore, it is possible to reduce the rectangular region RA to the high contribution degree region HCA at the reduction magnification adapted to each direction. With smaller reduction magnification in a direction in which many peripheral portions are considered to be included empirically (Y direction in which an upper eyelid and a lower eyelid are included in a case where the target portion is a pupil) or the like, it is possible to further exclude the peripheral portion from the high contribution degree region HCA and thus the region used for the focusing calculation. Therefore, it is possible to further reduce the concern that the peripheral portion is focused, instead of the target portion. The directions (first direction and second direction) in which the reduction magnifications are made different from each other do not have to be perpendicular as in the X direction and the Y direction described as an example.

As shown in FIG. 21, the setting unit 92 changes the reduction magnification of the high contribution degree region HCA according to the size of the rectangular region RA. Therefore, it is possible to reduce the rectangular region RA to the high contribution degree region HCA at the reduction magnification adapted to the size of the rectangular region RA.

As shown in FIGS. 26 to 33, the setting unit 92 controls the reduction of the rectangular region RA according to the inclination of the target portion with respect to the rectangular region RA. More specifically, the setting unit 92 decides whether or not to perform the reduction of the rectangular region RA to the high contribution degree region HCA based on whether or not the target portion is inclined with respect to the rectangular region RA. In a case where the target portion is inclined with respect to the rectangular region RA, many peripheral portions are included in the rectangular region RA as compared with a case where the target portion is not inclined. Therefore, in a case where the reduction is performed in a case where the target portion is inclined with respect to the rectangular region RA, it is possible to further exclude the peripheral portion from the region used for the focusing calculation. Therefore, even in a case where the target portion is inclined with respect to the rectangular region RA and many peripheral portions are included in the rectangular region RA, it is possible to reduce the concern that the peripheral portion is focused, instead of the target portion.

As shown in FIGS. 30 to 32, the setting unit 92 controls the reduction according to the orientation of the target subject with respect to the imaging element 12. More specifically, the setting unit 92 decides whether or not to perform the reduction of the rectangular region RA to the high contribution degree region HCA based on whether or not the target subject faces the front. In a case where the target subject is a vehicle, the target portion is a head or a body, the target portion is not inclined with respect to the rectangular region RA, and further, the target subject does not face the front, only a side surface of the head or the body is shown in the rectangular region RA and there are almost no portions having different depths in the rectangular region RA, as shown in FIGS. 30 and 32. That is, in this case, in a case where the rectangular region RA is maintained as it is without being reduced to the high contribution degree region HCA, a large number of feature points required for focusing can be left, and there is a high possibility that the target portion is focused. Therefore, with no reduction in a case where the target subject is a vehicle, the target portion is a head or a body, the target portion is not inclined with respect to the rectangular region RA, and further, the target subject does not face the front, it is possible to avoid unnecessary processing.

As shown in FIG. 20 and FIGS. 23 to 25, in a case where the target subject is a person or an animal and the target portion is a pupil of the person, a body of the person, a pupil of the animal, or a body of the animal, the setting unit 92 reduces the rectangular region RA to the high contribution degree region HCA. Therefore, it is possible to effectively remove the peripheral portion from the region used for the focusing calculation.

As shown in FIGS. 26 to 29, in a case where the target subject is a person, an animal, or a vehicle, the target portion is a face of the person, a face of the animal, or a cab seat of the vehicle, and the target portion is not inclined with respect to the rectangular region RA, the setting unit 92 does not reduce the rectangular region RA to the high contribution degree region HCA. Therefore, it is possible to avoid unnecessary processing. On the other hand, in a case where the target portion is inclined with respect to the rectangular region RA, the setting unit 92 performs the reduction. Therefore, it is possible to further exclude the peripheral portion from the region used for the focusing calculation. Even in a case where the target portion is inclined with respect to the rectangular region RA and many peripheral portions are included in the rectangular region RA, it is possible to reduce the concern that the peripheral portion is focused, instead of the target portion.

As shown in FIGS. 30 to 33, in a case where the target subject is a vehicle, the target portion is a head of the vehicle or a body of the vehicle, the target portion is not inclined with respect to the rectangular region RA, and the rectangular region RA does not face the front, the setting unit 92 does not reduce the rectangular region RA to the high contribution degree region HCA. Therefore, it is possible to avoid unnecessary processing. On the other hand, in a case where the target portion is not inclined with respect to the rectangular region RA and the target subject faces the front, and in a case where the target portion is inclined with respect to the rectangular region RA, the setting unit 92 performs the reduction. Therefore, it is possible to further exclude the peripheral portion from the region used for the focusing calculation. It is possible to reduce the concern that the peripheral portion is focused, instead of the target portion.

Second Embodiment

Figure 37:
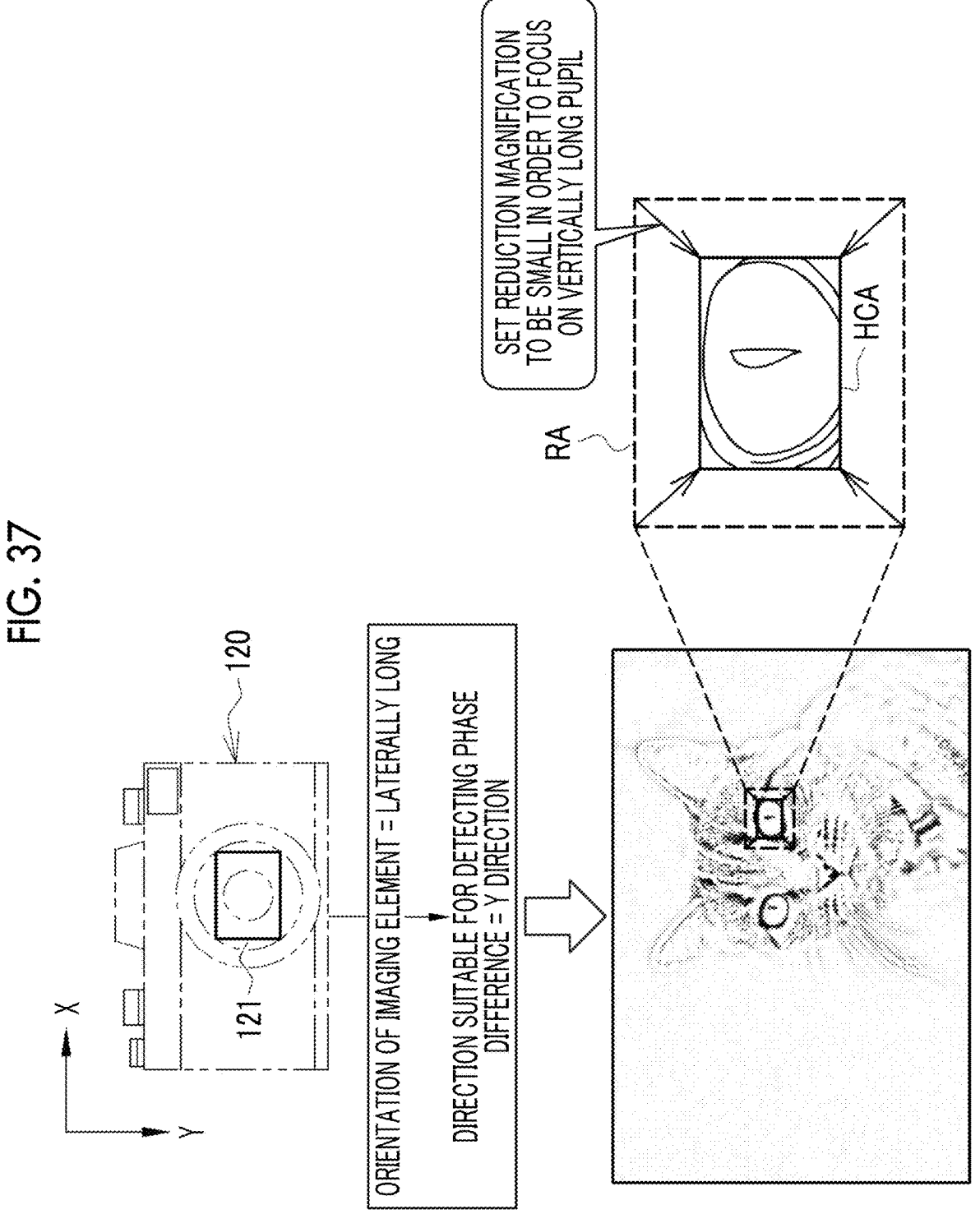
FIG. 37 is a diagram showing the high contribution degree region in a case where an orientation of the imaging element is laterally long.
Figure 38:
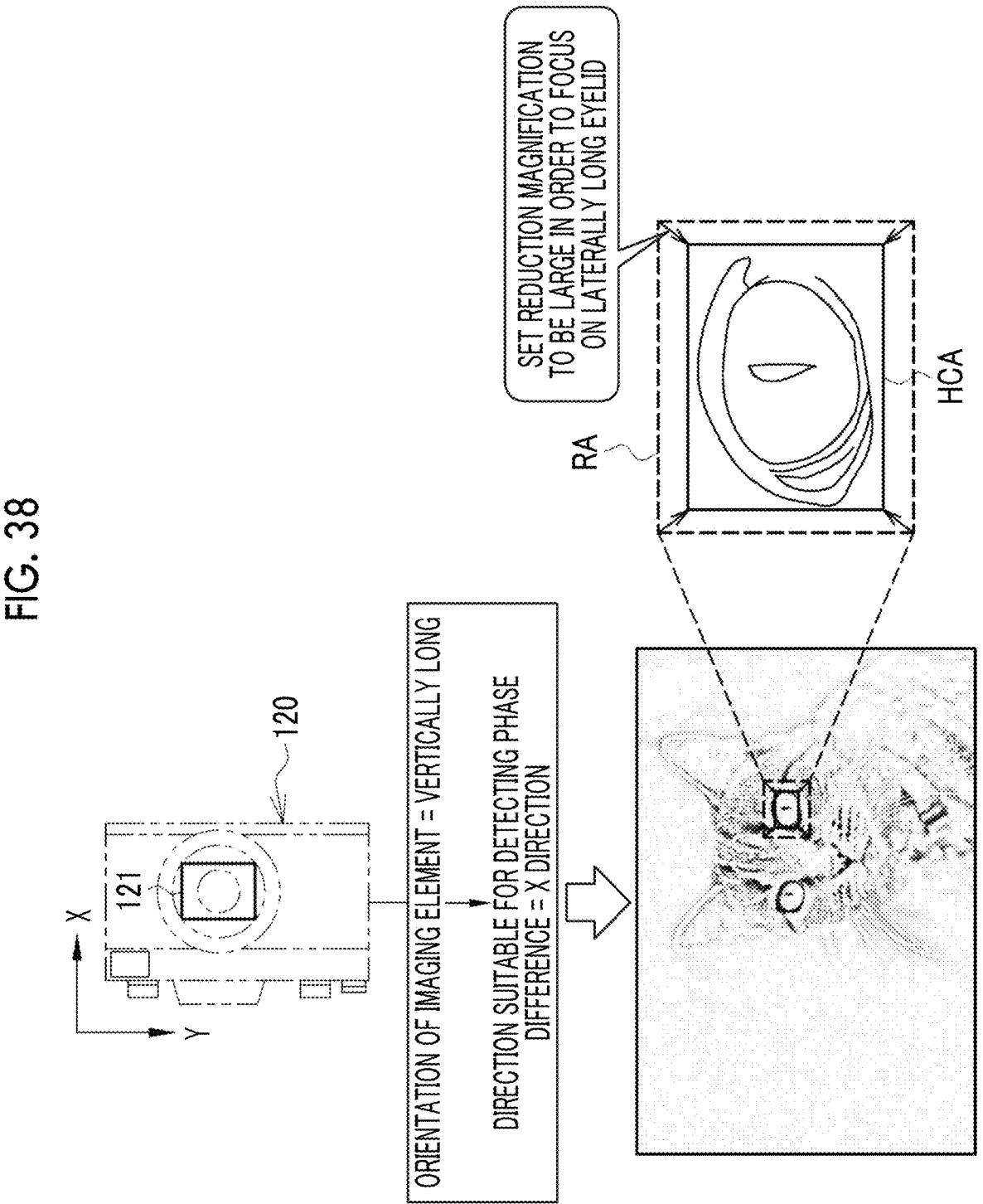
FIG. 38 is a diagram showing the high contribution degree region in a case where the orientation of the imaging element is vertically long.

As shown in FIGS. 37 and 38 as an example, in an imaging apparatus 120 of a second embodiment, a direction suitable for detecting the phase difference α differs according to an orientation of an imaging element 121. More specifically, in the imaging element 12 of the first embodiment, one set of the first phase difference detection pixel 411P and the second phase difference detection pixel 412P, which are adjacent to each other in the X direction and Y direction, are configured to detect the phase difference α. However, in the imaging element 121, in a case where a long side direction of the imaging element 121 is in a laterally long orientation shown in FIG. 37, which is parallel to the X direction, one set of the first phase difference detection pixel 411P and the second phase difference detection pixel 412P, which are adjacent to each other only in the X direction, are configured to detect the phase difference α. For this reason, in a case where the imaging element 121 is in the laterally long orientation shown in FIG. 37, the direction suitable for the detection of the phase difference α is the Y direction. On the other hand, in a case where the long side direction of the imaging element 121 is in a vertically long orientation shown in FIG. 38, which is parallel to the Y direction, the direction suitable for detecting the phase difference α is the X direction.

FIGS. 37 and 38 exemplify a case where the target subject is an animal and the target portion is a pupil. In this example, in a case of FIG. 37 in which the orientation of the imaging element 121 is laterally long, the direction suitable for the detection of the phase difference α is the Y direction. Therefore, the setting unit 92 sets the reduction magnification from the rectangular region RA to the high contribution degree region HCA to be small in order to focus on a vertically long pupil, and the peripheral portion other than the pupil is excluded from the high contribution degree region HCA. On the other hand, in a case of FIG. 38 in which the orientation of the imaging element 121 is vertically long, the direction suitable for the detection of the phase difference α is the X direction. Therefore, the setting unit 92 sets the reduction magnification from the rectangular region RA to the high contribution degree region HCA to be large in order to focus on an edge of a laterally long upper or lower eyelid, and the edge of the upper or the lower eyelid is included in the high contribution degree region HCA.

As described above, in the second embodiment, in a case where the direction suitable for detecting the phase difference α differs according to the orientation of the imaging element 121, the setting unit 92 changes the reduction magnification of the high contribution degree region HCA according to the orientation of the imaging element 121. Therefore, it is possible to avoid a situation where the phase difference α is difficult to be detected depending on the orientation of the imaging element 121, which results in out of focus.

Third Embodiment

Figure 39:
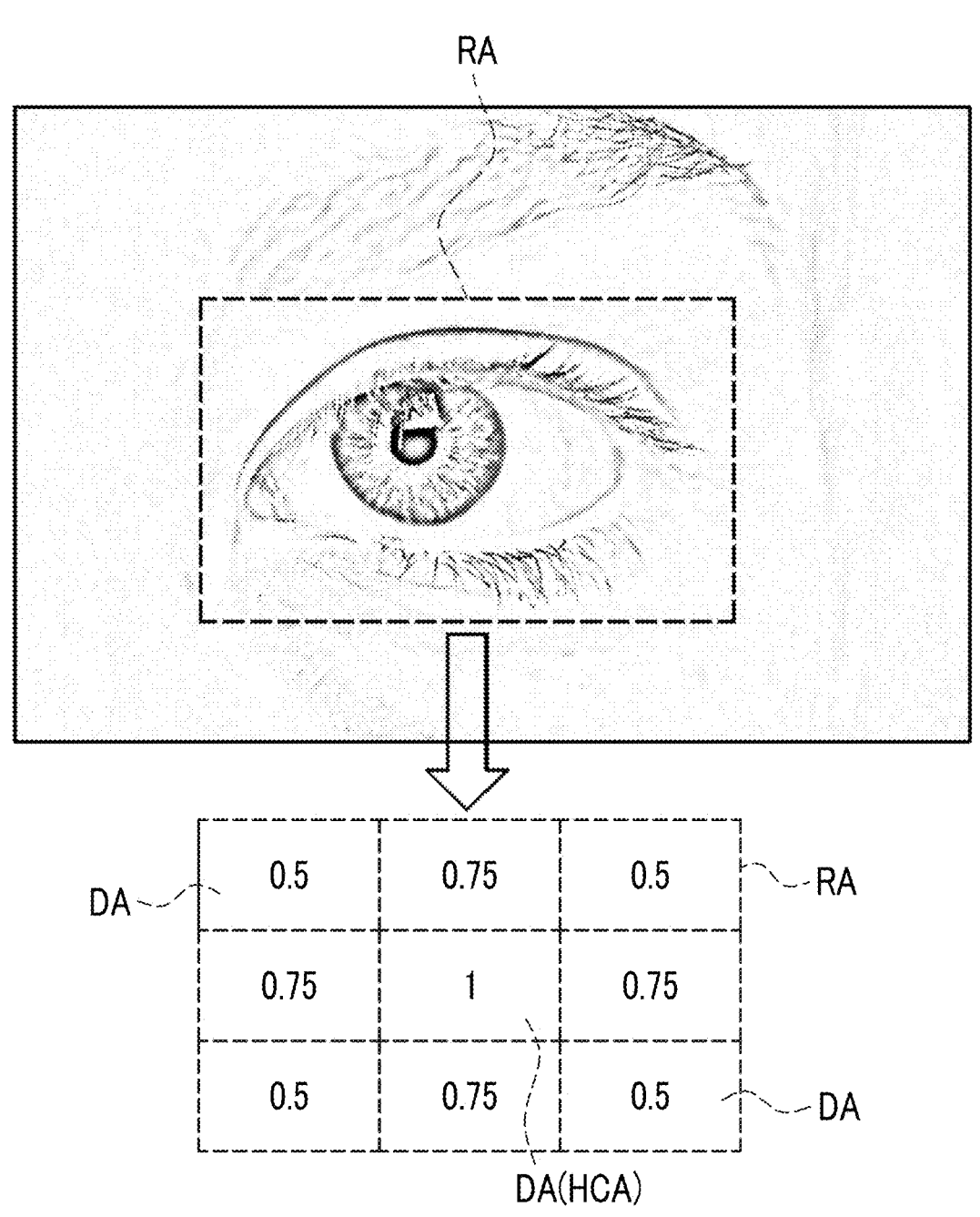
FIG. 39 is a diagram showing a third embodiment in which the degree of contribution of other regions other than the high contribution degree region is set to a value larger than zero and lower than the degree of contribution of the high contribution degree region.

In each of the above embodiments, the high contribution degree region HCA is set by reducing the rectangular region RA, but the present disclosure is not limited thereto. As shown in FIG. 39 as an example, the rectangular region RA may be divided into a plurality of divided regions DA and the setting unit 92 may set the degree of contribution to each divided region DA to set the high contribution degree region HCA.

In FIG. 39, the rectangular region RA is equally divided into nine divided regions DA. Then, the degree of contribution of the divided region DA at a center is set to 1, the degree of contribution of upper, lower, left, and right divided regions DA of the divided region DA at the center is set to 0.75, and the degree of contribution of divided regions DA diagonally to upper left, diagonally to lower left, diagonally to upper right, and diagonally to lower right of the divided region DA at the center is set to 0.5. The divided region DA at the center whose degree of contribution is set to 1, which is a maximum value, corresponds to the high contribution degree region HCA. Further, the divided regions DA other than the divided region DA at the center corresponds to "other regions" according to the technique of the present disclosure.

In this case, the focusing calculation unit 93 multiplies the phase difference α calculated from each divided region DA by the degree of contribution of each divided region DA, adds the multiplied phase differences α, and divides the result by the number of the divided regions DA. That is, the focusing calculation unit 93 calculates a weighted average of the phase differences α in which the degree of contribution is used as a weight. The focusing calculation unit 93 performs the final focusing calculation using the calculated weighted average of the phase differences α.

As described above, in the third embodiment, the setting unit 92 sets the degree of contribution of the regions other than the high contribution degree region HCA to a value larger than zero and lower than the degree of contribution of the high contribution degree region HCA. Therefore, it is possible to perform the focusing calculation in consideration of not only the high contribution degree region HCA but also the regions other than the high contribution degree region HCA.

In a case where the target subject is a moving object and the size of the rectangular region RA is equal to or larger than a preset first threshold value, control may be performed in which the reduction magnification is reduced to further reduce the rectangular region RA. In a case where the target subject is the moving object and the size of the rectangular region RA is less than a second threshold value, which is smaller than the first threshold value, control may be performed in which the reduction magnification is increased or the reduction is not performed.

The case has been exemplified in which the automatic focus control is performed by the focus adjustment unit 71 in a case where the instruction to prepare capturing of a static image or a video is issued in response to the half push operation of the release button, but the present disclosure is not limited thereto. The automatic focus control may be performed by the focus adjustment unit 71 during the display of the live view image before the half push operation of the release button.

In each of the embodiments described above, the so-called automatic focus control of phase difference detection type has been described as an example, but the present disclosure is not limited thereto. Instead of or in addition to the automatic focus control of phase difference detection type, an automatic focus control of contrast detection type may be employed. An imaging element may be used in which one pixel 41 is configured of two photoelectric conversion elements 47 and the one pixel 41 serves as the normal pixel 41N and the phase difference detection pixel 41P.

The imaging apparatus according to the technique of the present disclosure may be a compact digital camera, a smartphone, or a tablet terminal.

In each of the above-described embodiments, for example, the following various processors can be used as a hardware structure of processing units performing various pieces of processing, such as the image processing unit 27, the display controller 30, the instruction receiving unit 32, the detection unit 70, and the focus adjustment unit 71 (the inclination determination unit 90, the orientation determination unit 91, the setting unit 92, the focusing calculation unit 93, and the control of the focus lens driving controller 94. The various processors include, for example, the CPU 56 which is a general-purpose processor executing software (operation program 65) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to perform specific processing.

One processing unit may be configured by one of the various types of processors or may be configured by a combination of two or more processors of the same type or different types (for example, a combination of a plurality of FPGAs and/or a combination of a CPU and an FPGA). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

More specifically, a circuitry combining circuit elements such as semiconductor elements may be used as the hardware structure of the various processors.

It is possible to understand the techniques described in the following supplementary notes from the above description.

Supplementary Note 1

An automatic focus control device that performs focusing calculation for calculating a focusing position of a focus lens based on a signal for calculation read out from an imaging element, the automatic focus control device comprising:
a processor,
wherein the processor is configured to:

detect, from an image, a specific region including a target portion of a target subject of the focusing calculation and a peripheral portion of the target portion;
set a high contribution degree region where a degree of contribution to the focusing calculation is higher than other regions in the specific region, based on a combination of the target subject and the target portion; and
perform, in a case where the high contribution degree region is set, the focusing calculation in accordance with the setting.

Supplementary Note 2

The automatic focus control device according to Supplementary Note 1,
wherein the specific region has a rectangular shape.

Supplementary Note 3

The automatic focus control device according to Supplementary Note 1 or 2,
wherein the processor is configured to:
reduce a region used for the focusing calculation from the specific region to the high contribution degree region; and
perform the focusing calculation using the reduced high contribution degree region.

Supplementary Note 4

The automatic focus control device according to Supplementary Note 1 or 2,
wherein the processor is configured to:
perform the focusing calculation using only the reduced high contribution degree region.

Supplementary Note 5

The automatic focus control device according to Supplementary Note 3 or 4,
wherein the processor is configured to:
make a reduction magnification of the high contribution degree region in a first direction different from a reduction magnification of the high contribution degree region in a second direction intersecting the first direction.

Supplementary Note 6

The automatic focus control device according to any one of Supplementary Notes 3 to 5,
wherein the processor is configured to:
change a reduction magnification of the high contribution degree region according to a size of the specific region.

Supplementary Note 7

The automatic focus control device according to any one of Supplementary Notes 3 to 6,
wherein the processor is configured to:
control the reduction according to an inclination of the target portion with respect to the specific region.

Supplementary Note 8

The automatic focus control device according to any one of Supplementary Notes 3 to 7, wherein the processor is configured to:
control the reduction according to an orientation of the target subject with respect to the imaging element.

Supplementary Note 9

The automatic focus control device according to any one of Supplementary Notes 3 to 8,
wherein the imaging element includes a phase difference detection pixel that outputs the signal for calculation for detecting a phase difference of subject light, and
in a case where a direction suitable for detecting the phase difference differs according to an orientation of the imaging element,
the processor is configured to:
change a reduction magnification of the high contribution degree region according to the orientation of the imaging element.

Supplementary Note 10

The automatic focus control device according to any one of Supplementary Notes 3 to 9,
wherein the processor is configured to:
perform the reduction in a case where the target subject is a person or an animal and the target portion is a pupil of the person, a body of the person, a pupil of the animal, or a body of the animal.

Supplementary Note 11

The automatic focus control device according to any one of Supplementary Notes 3 to 10,
wherein the processor is configured to:
in a case where the target subject is a person, an animal, or a vehicle and the target portion is a face of the person, a face of the animal, or a cab seat of the vehicle,
not perform the reduction in a case where the target portion is not inclined with respect to the specific region, and
perform the reduction in a case where the target portion is inclined with respect to the specific region.

Supplementary Note 12

The automatic focus control device according to any one of Supplementary Notes 3 to 11,
wherein the processor is configured to:
in a case where the target subject is a vehicle and the target portion is a head of the vehicle or a body of the vehicle,
not perform the reduction in a case where the target portion is not inclined with respect to the specific region and the target subject does not face a front, and
perform the reduction in a case where the target portion is not inclined with respect to the specific region and the target subject faces the front, and in a case where the target portion is inclined with respect to the specific region.

Supplementary Note 13

The automatic focus control device according to any one of Supplementary Notes 3 to 11,
wherein the processor is configured to:
set a degree of contribution of the other regions other than the high contribution degree region to a value larger than zero and lower than a degree of contribution of the high contribution degree region.

Supplementary Note 14

An imaging apparatus comprising:
the automatic focus control device according to any one of Supplementary Notes 1 to 13.
The above various embodiments and/or various modification examples can be combined as appropriate in the technique of the present disclosure. It is needless to say that the technique of the present disclosure is not limited to each of the embodiments described above and various configurations can be employed without departing from the gist. Further, the technique of the present disclosure extends to a storage medium that stores the program non-transitorily, in addition to the program.
The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. In order to avoid complication and facilitate understanding of the portion according to the technique of the present disclosure, the description related to common general knowledge not requiring special description in order to implement the technique of the present disclosure is omitted in the above description content and illustrated content.
In the present specification, "A and/or B" is synonymous with "at least one of A or B". That is, "A and/or B" means that only A may be used, only B may be used, or a combination of A and B may be used. In the present specification, the same concept as "A and/or B" is also applied to a case where three or more matters are linked and expressed by "and/or".
All documents, patent applications, and technical standards described in the present specification are incorporated by reference in the present specification to the same extent as in a case where the incorporation of each individual document, patent application, and technical standard by reference is specifically and individually described.

What is claimed is:
1. An automatic focus control device that performs focusing calculation for calculating a focusing position of a focus lens based on a signal for calculation read out from an imaging element, the automatic focus control device comprising:
a processor,
wherein the processor is configured to:
detect, from an image, a specific region including a target portion of a target subject of the focusing calculation and a peripheral portion of the target portion;
set a high contribution degree region where a degree of contribution to the focusing calculation is higher than other regions in the specific region, based on a combination of the target subject and the target portion; and
perform, in a case where the high contribution degree region is set, the focusing calculation in accordance with the setting.

2. The automatic focus control device according to claim 1, wherein the specific region has a rectangular shape.

3. The automatic focus control device according to claim 1, wherein the processor is configured to:

reduce a region used for the focusing calculation from the specific region to the high contribution degree region; and perform the focusing calculation using the reduced high contribution degree region.

4. The automatic focus control device according to claim 3, wherein the processor is configured to:

perform the focusing calculation using only the reduced high contribution degree region.

5. The automatic focus control device according to claim 3, wherein the processor is configured to:

make a reduction magnification of the high contribution degree region in a first direction different from a reduction magnification of the high contribution degree region in a second direction intersecting the first direction.

6. The automatic focus control device according to claim 3, wherein the processor is configured to:

change a reduction magnification of the high contribution degree region according to a size of the specific region.

7. The automatic focus control device according to claim 3, wherein the processor is configured to:

control the reduction according to an inclination of the target portion with respect to the specific region.

8. The automatic focus control device according to claim 3, wherein the processor is configured to:

control the reduction according to an orientation of the target subject with respect to the imaging element.

9. The automatic focus control device according to claim 3, wherein the imaging element includes a phase difference detection pixel that outputs the signal for calculation for detecting a phase difference of subject light, and in a case where a direction suitable for detecting the phase difference differs according to an orientation of the imaging element, the processor is configured to:

change a reduction magnification of the high contribution degree region according to the orientation of the imaging element.

10. The automatic focus control device according to claim 3, wherein the processor is configured to:

perform the reduction in a case where the target subject is a person or an animal and the target portion is a pupil of the person, a body of the person, a pupil of the animal, or a body of the animal.

11. The automatic focus control device according to claim 3, wherein the processor is configured to:

in a case where the target subject is a person, an animal, or a vehicle and the target portion is a face of the person, a face of the animal, or a cab seat of the vehicle, not perform the reduction in a case where the target portion is not inclined with respect to the specific region, and perform the reduction in a case where the target portion is inclined with respect to the specific region.

12. The automatic focus control device according to claim 3, wherein the processor is configured to:

in a case where the target subject is a vehicle and the target portion is a head of the vehicle or a body of the vehicle, not perform the reduction in a case where the target portion is not inclined with respect to the specific region and the target subject does not face a front, and perform the reduction in a case where the target portion is not inclined with respect to the specific region and the target subject faces the front, and in a case where the target portion is inclined with respect to the specific region.

13. The automatic focus control device according to claim 1, wherein the processor is configured to:

set a degree of contribution of the other regions other than the high contribution degree region to a value larger than zero and lower than a degree of contribution of the high contribution degree region.

14. An imaging apparatus comprising:

the automatic focus control device according to claim 1.

15. An operation method of an automatic focus control device that performs focusing calculation for calculating a focusing position of a focus lens based on a signal for calculation read out from an imaging element, the operation method comprising:

detecting, from an image, a specific region including a target portion of a target subject of the focusing calculation and a peripheral portion of the target portion;

setting a high contribution degree region where a degree of contribution to the focusing calculation is higher than other regions in the specific region, based on a combination of the target subject and the target portion; and performing, in a case where the high contribution degree region is set, the focusing calculation in accordance with the setting.

16. A non-transitory computer-readable storage medium storing an operation program of an automatic focus control device that performs focusing calculation for calculating a focusing position of a focus lens based on a signal for calculation read out from an imaging element, the operation program causing a computer to execute a process comprising:

detecting, from an image, a specific region including a target portion of a target subject of the focusing calculation and a peripheral portion of the target portion;

setting a high contribution degree region where a degree of contribution to the focusing calculation is higher than other regions in the specific region, based on a combination of the target subject and the target portion; and performing, in a case where the high contribution degree region is set, the focusing calculation in accordance with the setting.

* * * * *